United States Patent
Huang et al.

(10) Patent No.: US 11,394,434 B2
(45) Date of Patent: Jul. 19, 2022

(54) SUBBAND PRECODING CONFIGURATION BASED ON A TRANSMIT POWER PARAMETER FOR UPLINK COMMUNICATIONS

(71) Applicant: QUALCOMM INCORPORATED, San Diego, CA (US)

(72) Inventors: Yi Huang, San Diego, CA (US); Alexandros Manolakos, San Diego, CA (US); Wei Yang, San Diego, CA (US); Wanshi Chen, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/948,360

(22) Filed: Sep. 15, 2020

(65) Prior Publication Data
US 2021/0126681 A1  Apr. 29, 2021

(30) Foreign Application Priority Data
Oct. 25, 2019  (GR) .............................. 20190100476

(51) Int. Cl.
*H04B 7/0456* (2017.01)
*H04B 7/06* (2006.01)
(Continued)

(52) U.S. Cl.
CPC ......... *H04B 7/0456* (2013.01); *H04B 7/0639* (2013.01); *H04W 8/24* (2013.01); *H04W 72/042* (2013.01); *H04W 72/0473* (2013.01)

(58) Field of Classification Search
CPC .. H04B 7/0456; H04B 7/0639; H04B 7/0645; H04B 7/0426; H04B 7/0465;
(Continued)

(56) References Cited

U.S. PATENT DOCUMENTS

| 2013/0155976 A1* | 6/2013 | Chen ................... H04W 72/048 370/329 |
| 2019/0124631 A1* | 4/2019 | Ren ..................... H04W 72/042 |

(Continued)

OTHER PUBLICATIONS

Catt: "Discussion on Codebook Based Transmission for UL", 3GPP Draft, 3GPP TSG RAN WG1 Meeting NR#3, R1-1715794, 3RD Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017 Sep. 17, 2017 (Sep. 17, 2017), XP051339254, 6 Pages, Retrieved from the Internet: URL:http://www.3gpp.org/ftp/Meetings_3GPP_SYNC/RAN1/Docs/ [retrieved on Sep. 17, 2017] the whole document.

(Continued)

*Primary Examiner* — Kiet Tang
(74) *Attorney, Agent, or Firm* — Haynes and Boone, LLP

(57) ABSTRACT

Wireless communications systems and methods related to wireless communications in a system are provided. A user equipment (UE) may receive from a base station (BS), a subband precoding configuration indicating a plurality of precoders for a plurality of subbands based on a transmit power parameter, where each precoder of the plurality of precoders is configured for one subband of the plurality of subbands. Additionally, the UE may transmit to the BS, a communication signal in the plurality of subbands using the plurality of precoders, where the transmitted communication signal satisfies the transmit power parameter.

30 Claims, 23 Drawing Sheets

(51) Int. Cl.
*H04W 72/04* (2009.01)
*H04W 8/24* (2009.01)

(58) Field of Classification Search
CPC .... H04B 7/0404; H04W 8/24; H04W 72/042; H04W 72/0473; H04W 8/22; H04W 72/048; H04L 5/006; H01Q 21/24
See application file for complete search history.

(56) References Cited

U.S. PATENT DOCUMENTS

| | | | | |
|---|---|---|---|---|
| 2019/0149365 | A1* | 5/2019 | Chatterjee | H04L 25/0226 370/329 |
| 2019/0199417 | A1* | 6/2019 | Noh | H04L 5/006 |
| 2021/0359733 | A1* | 11/2021 | Harrison | H01Q 21/24 |

OTHER PUBLICATIONS

Ericsson: "Codebook Based UL MIMO Remaining Details", 3GPP Draft, 3GPP TSG-RAN WG1 #91, R1-1720731 UL MIMO for Codebook Based Transmission, 3RD Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017 Nov. 18, 2017 (Nov. 18, 2017), XP051370188, pp. 1-23, Retrieved from the Internet: URL: http://www.3gpp.org/ftp/tsg%5Fran/WG1%5FRL1/TSGR1%5F91/Docs/ [retrieved on Nov. 18, 2017] the whole document.
International Search Report and Written Opinion—PCT/US2020/051141—ISAEPO—dated Nov. 20, 2020.

* cited by examiner

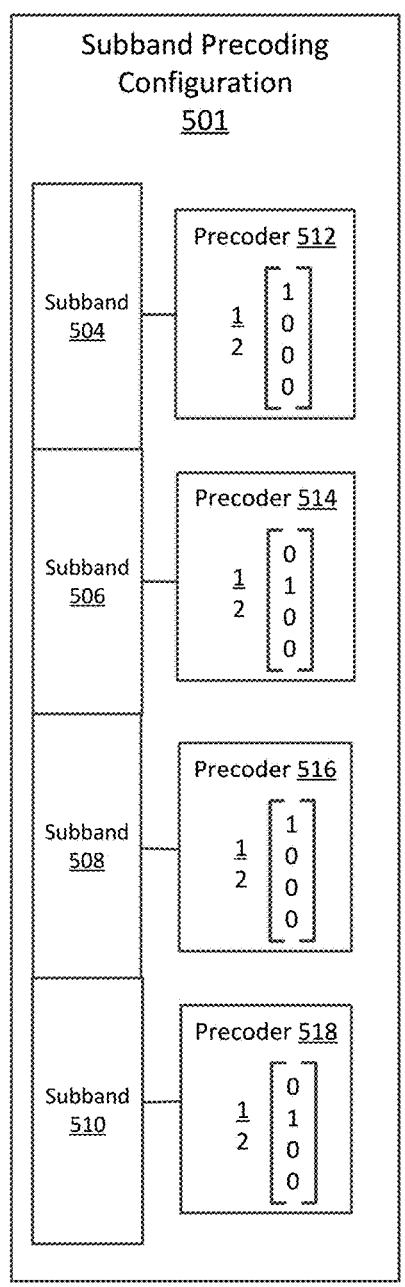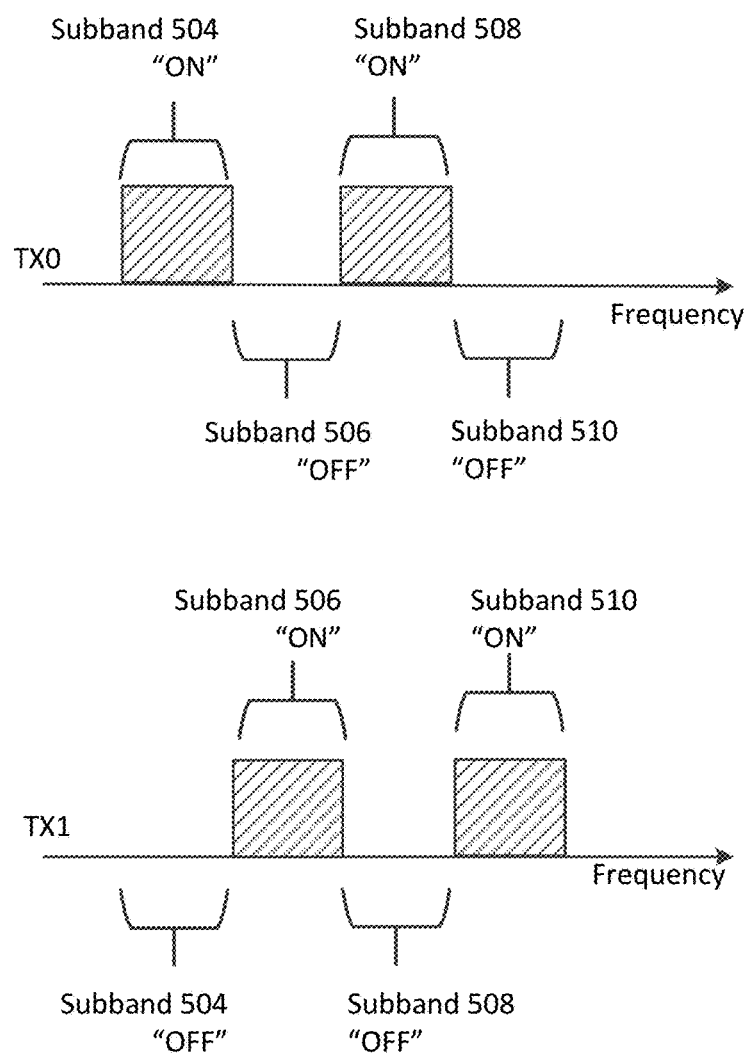
FIG. 5

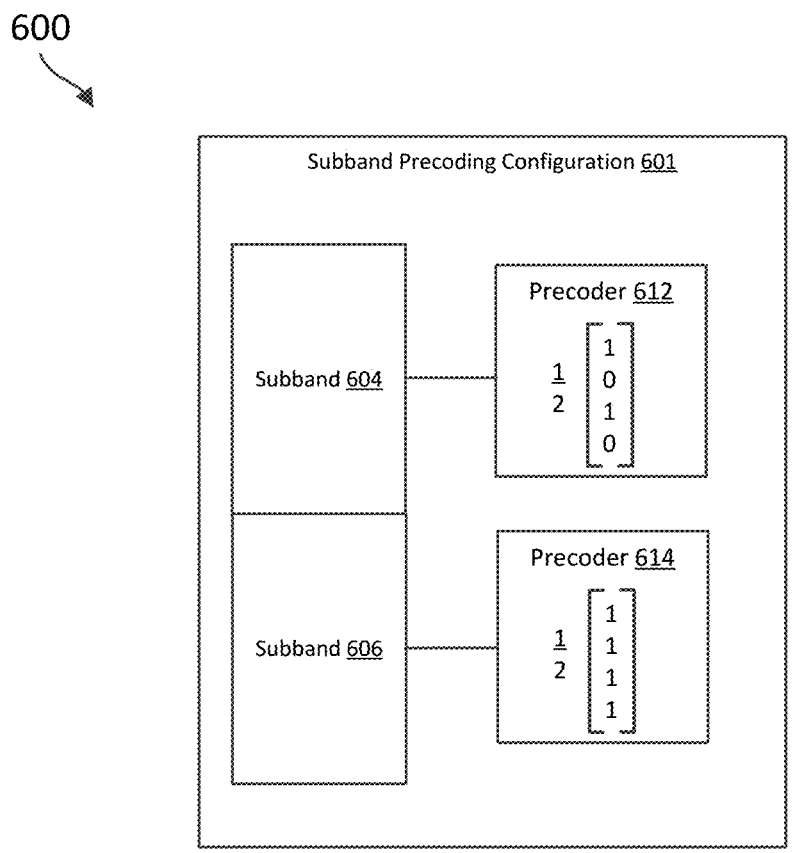
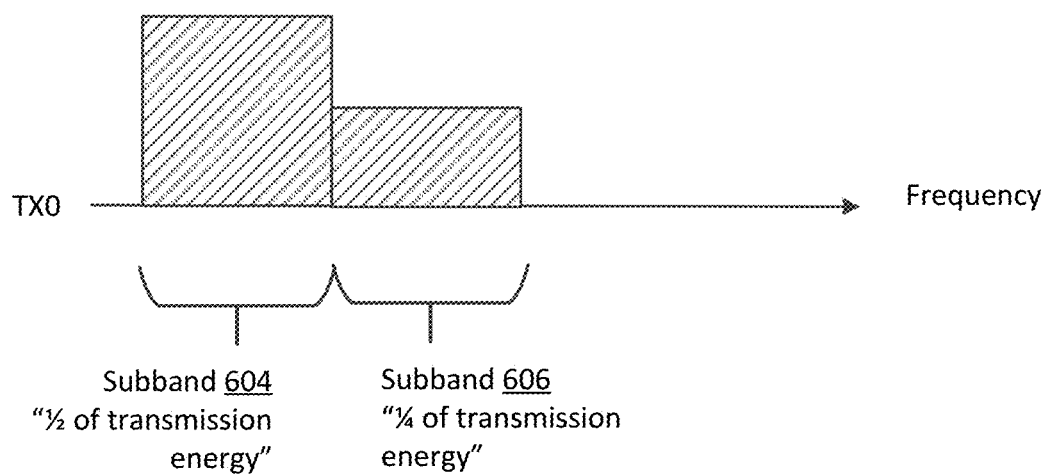
FIG. 6

700

Precoding Matrix W for a single-layer transmission for a UE having two antenna ports

| TPMI index | W (ordered from left to right in increasing order of TPMI index) |
|---|---|
| 0 – 5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ |

Set of non-coherent precoders 702

Set of fully coherent precoders 704

Precoding Matrix W for a two-layer transmission for a UE having two antenna ports, with transform precoding disabled

| TPMI index | W (ordered from left to right in increasing order of TPMI index) |
|---|---|
| 0 – 2 | $\frac{1}{\sqrt{2}}\begin{bmatrix}1&0\\0&1\end{bmatrix}$ $\frac{1}{2}\begin{bmatrix}1&1\\1&-1\end{bmatrix}$ $\frac{1}{2}\begin{bmatrix}1&1\\j&-j\end{bmatrix}$ |

Set of non-coherent precoders 802

Set of fully coherent precoders 804

FIG. 8

Precoding Matrix $W$ for a two-layer transmission for a UE having four antenna ports, with transform precoding disabled

| TPMI index | $W$ (ordered from left to right in increasing order of TPMI index) | | | |
|---|---|---|---|---|
| 0 – 3 | $\frac{1}{2}\begin{bmatrix} 1 & 0 \\ 0 & 1 \\ 0 & 0 \\ 0 & 0 \end{bmatrix}$ | $\frac{1}{2}\begin{bmatrix} 1 & 0 \\ 0 & 0 \\ 0 & 1 \\ 0 & 0 \end{bmatrix}$ | $\frac{1}{2}\begin{bmatrix} 1 & 0 \\ 0 & 0 \\ 0 & 0 \\ 0 & 1 \end{bmatrix}$ | $\frac{1}{2}\begin{bmatrix} 0 & 0 \\ 1 & 0 \\ 0 & 1 \\ 0 & 0 \end{bmatrix}$ |
| 4 – 7 | $\frac{1}{2}\begin{bmatrix} 0 & 0 \\ 1 & 0 \\ 0 & 0 \\ 0 & 1 \end{bmatrix}$ | $\frac{1}{2}\begin{bmatrix} 0 & 0 \\ 0 & 0 \\ 1 & 0 \\ 0 & 1 \end{bmatrix}$ | $\frac{1}{2}\begin{bmatrix} 1 & 0 \\ 0 & 1 \\ 1 & 0 \\ 0 & -j \end{bmatrix}$ | $\frac{1}{2}\begin{bmatrix} 1 & 0 \\ 0 & 1 \\ 1 & 0 \\ 0 & j \end{bmatrix}$ |
| 8 – 11 | $\frac{1}{2}\begin{bmatrix} 1 & 0 \\ 0 & 1 \\ -j & 0 \\ 0 & 1 \end{bmatrix}$ | $\frac{1}{2}\begin{bmatrix} 1 & 0 \\ 0 & 1 \\ -j & 0 \\ 0 & -1 \end{bmatrix}$ | $\frac{1}{2}\begin{bmatrix} 1 & 0 \\ 0 & 1 \\ -1 & 0 \\ 0 & -j \end{bmatrix}$ | $\frac{1}{2}\begin{bmatrix} 1 & 0 \\ 0 & 1 \\ -1 & 0 \\ 0 & j \end{bmatrix}$ |
| 12 – 15 | $\frac{1}{2}\begin{bmatrix} 1 & 0 \\ 0 & 1 \\ j & 0 \\ 0 & 1 \end{bmatrix}$ | $\frac{1}{2}\begin{bmatrix} 1 & 0 \\ 0 & 1 \\ j & 0 \\ 0 & -1 \end{bmatrix}$ | $\frac{1}{2\sqrt{2}}\begin{bmatrix} 1 & 1 \\ 1 & 1 \\ 1 & -1 \\ 1 & -1 \end{bmatrix}$ | $\frac{1}{2\sqrt{2}}\begin{bmatrix} 1 & 1 \\ 1 & 1 \\ j & -j \\ j & -j \end{bmatrix}$ |
| 16 – 19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20 – 21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | | |

Number of bits of "subband PMIs" for four antenna ports and for a maximum two-layer, three-layer, or four-layer transmission, if transform precoder is disabled

| | codebookSubset = fullyAndPartialAndNonCoherent | | | codebookSubset = partialAndNonCoherent | | | codebookSubset = nonCoherent | | |
|---|---|---|---|---|---|---|---|---|---|
| | Used precoder type | # layers | # bits in sub-band PMIs | Used precoder type | # layers | # bits in sub-band PMIs | Used precoder type | # layers | # bits in sub-band PMIs |
| 1702 | Partial coherent | 1 | 2(X-1) | Partial coherent | 1 | 2(X-1) | - | - | - |
| 1704 | Full coherent | 1 | 4(X-1) | Partial coherent | 2 | 3(X-1) | - | - | - |
| 1706 | Full+partial coherent | 2 | 4(X-1) | Partial coherent | 3 | 1(X-1) | - | - | - |
| 1708 | Full+partial coherent | 3 | 3(X-1) | Full+partial+ non-coherent | 4 | 2(X-1) | - | - | - |
| 1710 | Full+partial+ non-coherent | 4 | 3(X-1) | - | - | - | - | - | - |

First set of entries
1701

Second set of entries
1712

Subband precoding signaling information for four antenna ports and a maximum two-layer, three-layer, or four-layer transmission, if transform precoder is disabled

| | codebookSubset = fullyAndPartialAndNonCoherent | | | | codebookSubset = partialAndNonCoherent | | |
|---|---|---|---|---|---|---|---|
| Bit field mapped to index | Precoding information and number of layers interpretation | # bits for sub-band PMIs | Sub-band PMI signal table | Bit field mapped to index | Precoding information and number of layers interpretation | # bits for sub-band PMIs | Sub-band PMI signal table |
| 0 | 1 layer: TPMI=0 | NA | NA | 0 | 1 layer: TPMI=0 | NA | NA |
| 1 | 1 layer: TPMI=1 | NA | NA | 1 | 1 layer: TPMI=1 | NA | NA |
| 2 | | NA | NA | 2 | | NA | NA |
| 3 | 1 layer: TPMI=3 | NA | NA | 3 | 1 layer: TPMI=3 | NA | NA |
| 4 | 2 layers: TPMI=0 | NA | NA | 4 | 2 layers: TPMI=0 | NA | NA |
| | | NA | NA | | | NA | NA |
| 9 | 2 layers: TPMI=5 | NA | NA | 9 | 2 layers: TPMI=5 | NA | NA |
| 10 | 3 layers: TPMI=0 | NA | NA | 10 | 3 layers: TPMI=0 | NA | NA |
| 11 | 4 layers: TPMI=0 | +3(X-1) | 4TX-L4F | 11 | 4 layers: TPMI=0 | +2(X-1) | 4TX-L4P |
| 12 | 1 layer: TPMI=4 | +2(X-1) | 4TX-L1PA | 12 | 1 layer: TPMI=4 | +2(X-1) | 4TX-L1PA |
| | | +2(X-1) | 4TX-L1PA | | | +2(X-1) | 4TX-L1PA |
| 15 | 1 layer: TPMI=7 | +2(X-1) | 4TX-L1PA | 15 | 1 layer: TPMI=7 | +2(X-1) | 4TX-L1PA |
| 16 | 1 layer: TPMI=8 | +2(X-1) | 4TX-L1PB | 16 | 1 layer: TPMI=8 | +2(X-1) | 4TX-L1PB |
| | | +2(X-1) | 4TX-L1PB | | | +2(X-1) | 4TX-L1PB |
| 19 | 1 layer: TPMI=11 | +2(X-1) | 4TX-L1PB | 19 | 1 layer: TPMI=11 | +2(X-1) | 4TX-L1PB |
| 20 | 2 layers: TPMI=6 | +4(X-1) | 4TX-L2F | 20 | 2 layers: TPMI=6 | +3(X-1) | 4TX-L2P |
| | | +4(X-1) | 4TX-L2F | | | +3(X-1) | 4TX-L2P |
| 27 | 2 layers: TPMI=13 | +4(X-1) | 4TX-L2F | 27 | 2 layers: TPMI=13 | +3(X-1) | 4TX-L2P |
| 28 | 3 layers: TPMI=1 | +3(X-1) | 4TX-L3F | 28 | 3 layers: TPMI=1 | +1(X-1) | 4TX-L3P |
| 29 | 3 layers: TPMI=2 | +3(X-1) | 4TX-L3F | 29 | 3 layers: TPMI=2 | +1(X-1) | 4TX-L3P |
| 30 | 4 layers: TPMI=1 | +3(X-1) | 4TX-L4F | 30 | 4 layers: TPMI=1 | +2(X-1) | 4TX-L4P |
| 31 | 4 layers: TPMI=2 | +3(X-1) | 4TX-L4F | 31 | 4 layers: TPMI=2 | +2(X-1) | 4TX-L4P |
| 32 | 1 layers: TPMI=12 | +4(X-1) | 4TX-L1F | | | | |
| | | +4(X-1) | 4TX-L1F | | | | |
| 47 | 1 layers: TPMI=27 | +4(X-1) | 4TX-L1F | | | | |
| 48 | 2 layers: TPMI=14 | +4(X-1) | 4TX-L2F | | | | |
| | | +4(X-1) | 4TX-L2F | | | | |
| 55 | 2 layers: TPMI=21 | +4(X-1) | 4TX-L2F | | | | |
| 56 | 3 layers: TPMI=3 | +3(X-1) | 4TX-L3F | | | | |
| | | +3(X-1) | 4TX-L3F | | | | |
| 59 | 3 layers: TPMI=6 | +3(X-1) | 4TX-L3F | | | | |
| 60 | 4 layers: TPMI=3 | +3(X-1) | 4TX-L4F | | | | |
| 61 | 4 layers: TPMI=4 | +3(X-1) | 4TX-L4F | | | | |
| 62-63 | reserved | NA | NA | | | | |

1802 — (row 12)

Number of bits of "subband PMIs" for four antenna ports and for a maximum single-layer transmission, if transform precoder is disabled

| codebookSubset = fullyAndPartialAndNonCoherent ||| codebookSubset = partialAndNonCoherent ||| codebookSubset = nonCoherent |||
|---|---|---|---|---|---|---|---|---|
| Used precoder type | # layers | # bits in sub-band PMIs | Used precoder type | # layers | # bits in sub-band PMIs | Used precoder type | # layers | # bits in sub-band PMIs |
| Partial coherent | 1 | 2(X-1) | Partial coherent | 1 | 2(X-1) | - | - | - |
| Full coherent | 1 | 4(X-1) | - | - | - | - | - | - |

1902 — Partial coherent row
1904 — Full coherent row

First set of entries 1901 — Second set of entries 1912

Subband precoding signaling information for four antenna ports and a maximum single-layer transmission, if transform precoder is disabled

| codebookSubset = fullyAndPartialAndNonCoherent ||| codebookSubset = partialAndNonCoherent |||
|---|---|---|---|---|---|
| Bit field mapped to index | Precoding information and number of layers — interpretation | # bits for sub-band PMIs | Sub-band PMI signal table | Bit field mapped to index | Precoding information and number of layers — interpretation | # bits for sub-band PMIs | Sub-band PMI signal table |

| Bit field mapped to index | interpretation | # bits for sub-band PMIs | Sub-band PMI signal table | Bit field mapped to index | interpretation | # bits for sub-band PMIs | Sub-band PMI signal table |
|---|---|---|---|---|---|---|---|
| 0 | 1 layer: TPMI=0 | NA | NA | 0 | 1 layer: TPMI=0 | NA | NA |
| 1 | 1 layer: TPMI=1 | NA | NA | 1 | 1 layer: TPMI=1 | NA | NA |
| ... | ... | NA | NA | ... | ... | NA | NA |
| 3 | 1 layer: TPMI=3 | NA | NA | 3 | 1 layer: TPMI=3 | NA | NA |
| 12 | 1 layer: TPMI=4 | +2(X-1) | 4TX-L1PA | 12 | 1 layer: TPMI=4 | +2(X-1) | 4TX-L1PA |
| ... | ... | +2(X-1) | 4TX-L1PA | ... | ... | +2(X-1) | 4TX-L1PA |
| 15 | 1 layer: TPMI=7 | +2(X-1) | 4TX-L1PA | 15 | 1 layer: TPMI=7 | +2(X-1) | 4TX-L1PA |
| 16 | 1 layer: TPMI=8 | +2(X-1) | 4TX-L1PB | 16 | 1 layer: TPMI=8 | +2(X-1) | 4TX-L1PB |
| ... | ... | +2(X-1) | 4TX-L1PB | ... | ... | +2(X-1) | 4TX-L1PB |
| 19 | 1 layer: TPMI=11 | +2(X-1) | 4TX-L1PB | 19 | 1 layer: TPMI=11 | +2(X-1) | 4TX-L1PB |
| 12 | 1 layers: TPMI=12 | +4(X-1) | 4TX-L1F | 12-15 | reserved | NA | NA |
| ... | ... | +4(X-1) | 4TX-L1F | | | | |
| 27 | 1 layers: TPMI=27 | +4(X-1) | 4TX-L1F | | | | |
| 28-31 | reserved | NA | NA | | | | |

Number of bits of "subband PMIs" for two antenna ports and for a maximum two-layer transmission, if transform precoder is disabled

| codebookSubset = fullyAndPartialAndNonCoherent | | | codebookSubset = nonCoherent | | |
|---|---|---|---|---|---|
| Used precoder type | # layers | # bits in sub-band PMIs | Used precoder type | # layers | # bits in sub-band PMIs |
| Full coherent | 1 | 2(X-1) | - | - | - |
| Full+non coherent | 2 | 2(X-1) | - | - | - |

First set of entries
2101

- 2102 points to Full coherent row
- 2104 points to Full+non coherent row

Subband precoding signaling information for two antenna ports and a maximum two-layer transmission, if transform precoder is disabled

| codebookSubset = fullyAndPartialAndNonCoherent | | | |
|---|---|---|---|
| Precoding information and number of layers | | # bits for sub-band PMIs | Sub-band PMI signal table |
| Bit field mapped to index | interpretation | | |
| 0 | 1 layer: TPMI=0 | NA | NA |
| 1 | 1 layer: TPMI=1 | NA | NA |
| 2 | 2 layers: TPMI=0 | +2(X-1) | 2TX-L2 |
| 3 | 1 layer: TPMI=2 | +2(X-1) | 2TX-L1 |
| 4 | 1 layer: TPMI=3 | +2(X-1) | 2TX-L1 |
| 5 | 1 layer: TPMI=4 | +2(X-1) | 2TX-L1 |
| 6 | 1 layer: TPMI=5 | +2(X-1) | 2TX-L1 |
| 7 | 2 layers: TPMI=1 | +2(X-1) | 2TX-L2 |
| 8 | 2 layers: TPMI=2 | +2(X-1) | 2TX-L2 |
| 9-15 | reserved | NA | NA |

Number of bits of "subband PMIs" for two antenna ports and for a maximum single-layer transmission, if transform precoder is disabled

| codebookSubset = fullyAndPartialAndNonCoherent | | | codebookSubset= nonCoherent | | |
|---|---|---|---|---|---|
| Used precoder type | # layers | # bits in sub-band PMIs | Used precoder type | # layers | # bits in sub-band PMIs |
| Full coherent | 1 | 2(X-1) | - | - | - |

Subband precoding signaling information for two antenna ports and a maximum single-layer transmission, if transform precoder is disabled

| codebookSubset = fullyAndPartialAndNonCoherent | | | |
|---|---|---|---|
| Precoding information and number of layers | | # bits for sub-band PMIs | Sub-band PMI signal table |
| Bit field mapped to index | interpretation | | |
| 0 | 1 layer: TPMI=0 | NA | NA |
| 1 | 1 layer: TPMI=1 | NA | NA |
| 2 | 1 layer: TPMI=2 | +2(X-1) | 2TX-L1 |
| 3 | 1 layer: TPMI=3 | +2(X-1) | 2TX-L1 |
| 4 | 1 layer: TPMI=4 | +2(X-1) | 2TX-L1 |
| 5 | 1 layer: TPMI=5 | +2(X-1) | 2TX-L1 |
| 6-7 | reserved | NA | NA |

Number of bits of "subband PMIs" for four antenna ports and for a maximum two-layer, three-layer, or four-layer transmission, if transform precoder is disabled

| codebookSubset = fullyAndPartialAndNonCoherent | | | codebookSubset = partialAndNonCoherent | | | codebookSubset = nonCoherent | | |
|---|---|---|---|---|---|---|---|---|
| Used precoder type | # layers | # bits in sub-band PMIs | Used precoder type | # layers | # bits in sub-band PMIs | Used precoder type | # layers | # bits in sub-band PMIs |
| Partial coherent | 1 | 4(X-1) | Partial coherent | 1 | 3(X-1) | - | - | - |
| Full coherent | 1 | 4(X-1) | Partial coherent | 2 | 3(X-1) | - | - | - |
| Full+partial coherent | 2 | 4(X-1) | Partial coherent | 3 | 3(X-1) | - | - | - |
| Full+partial coherent | 3 | 4(X-1) | Full+partial+non-coherent | 4 | 3(X-1) | - | - | - |
| Full+partial+non-coherent | 4 | 4(X-1) | - | - | - | - | - | - |

First set of entries 2601 — Second set of entries 2612

Number of bits of "subband PMIs" for four antenna ports and for a maximum single-layer transmission, if transform precoder is disabled

| codebookSubset = fullyAndPartialAndNonCoherent | | | codebookSubset = partialAndNonCoherent | | | codebookSubset = nonCoherent | | |
|---|---|---|---|---|---|---|---|---|
| Used precoder type | # layers | # bits in sub-band PMIs | Used precoder type | # layers | # bits in sub-band PMIs | Used precoder type | # layers | # bits in sub-band PMIs |
| Partial coherent | 1 | 4(X-1) | Partial coherent | 1 | 2(X-1) | - | - | - |
| Full coherent | 1 | 4(X-1) | - | - | - | - | - | - |

First set of entries 2701

FIG. 27

SUBBAND PRECODING CONFIGURATION BASED ON A TRANSMIT POWER PARAMETER FOR UPLINK COMMUNICATIONS

CROSS REFERENCE TO RELATED APPLICATIONS & PRIORITY CLAIM

The present application claims priority to and the benefit of the Greek Provisional Patent Application No. 20190100476 filed Oct. 25, 2019, which is hereby incorporated by reference in its entirety as if fully set forth below and for all applicable purposes.

TECHNICAL FIELD

This application relates to wireless communication systems, and more particularly to a subband precoding configuration based on a transmit power parameter.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long-term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A UE may transmit a data stream using one or more antennas to a BS. The UE may apply a precoder to symbols that are mapped to a plurality of subbands. In conventional wideband precoding, the UE applies only one precoder ("a common precoder") for all subbands across the physical uplink shared channel (PUSCH) assignment. In subband precoding, the UE may apply a plurality of precoders for a plurality of subbands across the PUSCH assignment.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes receiving, by a user equipment (UE) from a base station (BS), a subband precoding configuration indicating a plurality of precoders for a plurality of subbands based on a transmit power parameter, where each precoder of the plurality of precoders is configured for one subband of the plurality of subbands. The method also includes transmitting, by the UE to the BS, a communication signal in the plurality of subbands using the plurality of precoders, wherein the transmitted communication signal satisfies the transmit power parameter.

In an aspect of the disclosure, an apparatus includes a transceiver configured to: receive, by a UE from a BS, a subband precoding configuration indicating a plurality of precoders for a plurality of subbands based on a transmit power parameter, where each precoder of the plurality of precoders is configured for one subband of the plurality of subbands; and transmit, by the UE to the BS, a communication signal in the plurality of subbands using the plurality of precoders, wherein the transmitted communication signal satisfies the transmit power parameter.

In an aspect of the disclosure, a computer-readable medium having program code recorded thereon, the program code including: code for causing a UE to receive from a BS, a subband precoding configuration indicating a plurality of precoders for a plurality of subbands based on a transmit power parameter, where each precoder of the plurality of precoders is configured for one subband of the plurality of subbands; and code for causing the UE to transmit to the BS, a communication signal in the plurality of subbands using the plurality of precoders, where the transmitted communication signal satisfies the transmit power parameter.

In an aspect of the disclosure, an apparatus includes means for receiving from a BS, a subband precoding configuration indicating a plurality of precoders for a plurality of subbands based on a transmit power parameter, where each precoder of the plurality of precoders is configured for one subband of the plurality of subbands; and means for transmitting to the BS, a communication signal in the plurality of subbands using the plurality of precoders, where the transmitted communication signal satisfies the transmit power parameter.

In an aspect of the disclosure, a method of wireless communication includes transmitting, by a BS to a UE, a subband precoding configuration indicating a plurality of precoders for a plurality of subbands based on a transmit power parameter, where each precoder of the plurality of precoders is configured for one subband of the plurality of subbands. The method also includes receiving, by the BS from the UE, a communication signal in the plurality of subbands based on the plurality of precoders.

In an aspect of the disclosure, an apparatus includes a transceiver configured to: transmit, by a BS to a UE, a subband precoding configuration indicating a plurality of precoders for a plurality of subbands based on a transmit power parameter, where each precoder of the plurality of precoders is configured for one subband of the plurality of subbands; and receive, by the BS from the UE, a communication signal in the plurality of subbands based on the plurality of precoders.

In an aspect of the disclosure, a computer-readable medium having program code recorded thereon, the program code comprising: code for causing a BS to transmit to a UE, a subband precoding configuration indicating a plurality of precoders for a plurality of subbands based on a transmit power parameter, where each precoder of the plurality of precoders is configured for one subband of the plurality of subbands; and code for causing the BS to receive from the UE, a communication signal in the plurality of subbands based on the plurality of precoders.

In an aspect of the disclosure, an apparatus includes means for transmitting to a UE, a subband precoding configuration indicating a plurality of precoders for a plurality of subbands based on a transmit power parameter, where each precoder of the plurality of precoders is configured for one subband of the plurality of subbands; and means for receiving from the UE, a communication signal in the plurality of subbands based the plurality of precoders.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 5 illustrates an example subband precoding communication scheme that results in a non-constant power spectral density (PSD) for an UL communication signal.

FIG. 6 illustrates an example subband precoding communication scheme that results in a non-constant PSD for an UL communication signal.

FIG. 7 is a table of a codebook subset storing a precoding matrix W for single-layer transmission for a UE having two antenna ports according to some aspects of the present disclosure.

FIG. 8 is a table of a codebook subset storing a precoding matrix W for two-layer transmission for a UE having antenna ports according to some aspects of the present disclosure.

FIG. 10 is a table of a codebook subset storing a precoding matrix W for two-layer transmission for a UE having four antenna ports according to some aspects of the present disclosure.

FIG. 17 is a table storing information used for signaling a subband precoding configuration for a maximum two-layer, three-layer, or four-layer transmission for a UE having two antenna ports according to some aspects of the present disclosure.

FIG. 18 is a table storing subband precoding signaling information for four antenna ports and a maximum two-layer, three-layer, or four-layer transmission according to some aspects of the present disclosure.

FIG. 19 is a table storing information used for signaling a subband precoding configuration for a maximum single-layer transmission for a UE having four antenna ports according to some aspects of the present disclosure.

FIG. 20 is a table storing subband precoding signaling information for four antenna ports and a maximum single-layer transmission according to some aspects of the present disclosure.

FIG. 21 is a table storing information used for signaling a subband precoding configuration for a maximum two-layer transmission for a UE having two antenna ports according to some aspects of the present disclosure.

FIG. 22 is a table storing subband precoding signaling information for two antenna ports and a maximum two-layer transmission according to some aspects of the present disclosure.

FIG. 23 is a table storing information used for signaling a subband precoding configuration for a maximum single-layer transmission for a UE having two antenna ports according to some aspects of the present disclosure.

FIG. 24 is a table storing subband precoding signaling information for two antenna ports and a maximum single-layer transmission according to some aspects of the present disclosure.

FIG. 26 is a table storing information used for signaling a subband precoding configuration for a maximum two-layer, three-layer, or four-layer transmission for a UE having two antenna ports according to some aspects of the present disclosure.

FIG. 27 is a table storing information used for signaling a subband precoding configuration for a maximum single-layer transmission for a UE having four antenna ports according to some aspects of the present disclosure.

DETAILED DESCRIPTION

Figure 1:
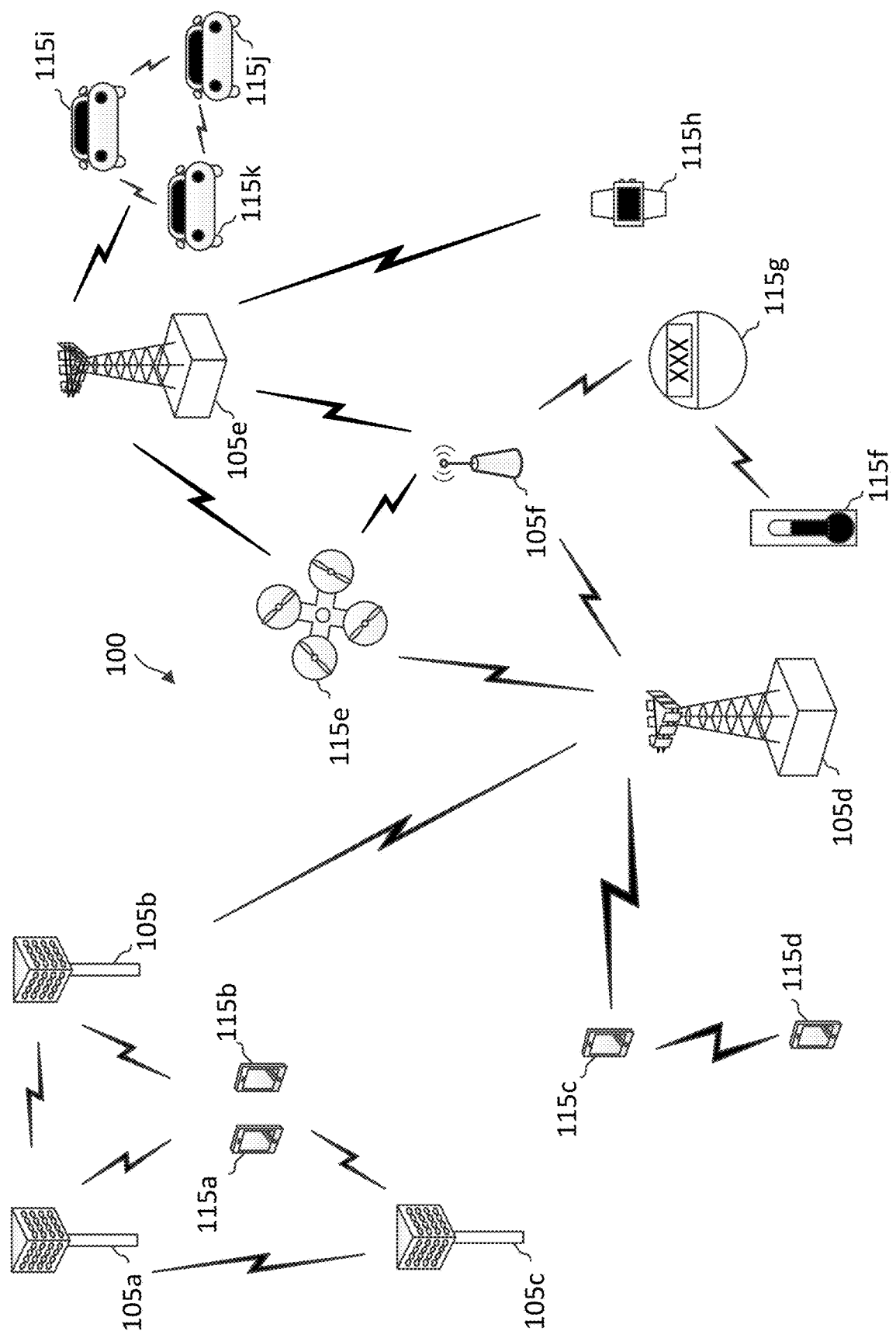
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an Ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, SCS may occur with 15 kHz, for example over 5, 10, 20 MHz, and the like bandwidth (BW). For other various outdoor and small cell coverage deployments of TDD greater than 3 GHz, SCS may occur with 30 kHz over 80/100 MHz BW. For other various indoor wideband implementations, using a TDD over the unlicensed portion of the 5 GHz band, the SCS may occur with 60 kHz over a 160 MHz BW. Finally, for various deployments transmitting with mmWave components at a TDD of 28 GHz, the SCS may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects or examples set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

In conventional wideband precoding, the UE applies only one precoder ("a common precoder") for all subbands across the PUSCH assignment. In subband precoding, the UE may apply a plurality of precoders for a plurality of subbands across the PUSCH assignment. The BS may transmit to the UE, a subband precoding configuration indicating a plurality of precoders for a plurality of subbands. The BS may configure the transform precoding by disabling or enabling it. A TPMI index or a matrix W may indicate the precoder for the UE to apply for a subband.

An advantage of using subband precoding rather than wideband precoding may provide for beamforming gains. Selection of a precoder (e.g., via a TPMI index or a matrix W) may function as a mechanism for selecting specific beams or beamforming. The BS and UE may communicate information using beams, and each of the BS and the UE may steer its energy in a particular direction, reaping array gains in the process and bridging the link budget. Beamforming techniques may be used to increase the signal level received by a device and to avoid transmission losses when using, for example, mmWave frequencies. A beamformer enhances energy over its targeted/intended direction(s), obtaining a certain antenna gain in a given direction while having attenuation in others. Beamforming combines signals from multiple antenna elements in an antenna array, so that the combined signal level increases when several signal phases align (constructive interference). The signals from each antenna element are transmitted with a slightly different phase (delay) to produce a narrow beam directed towards the receiver. Accordingly, a beamforming gain may result on a per-subband basis.

An improved beamforming gain on a per-subband basis may be used to explore channel frequency selectivity. Additionally, improved beamforming gain on a per-subband basis may also be used to explore variation of interference levels. The interference may be different on different RBs. Moreover, improved beamforming gain on a per-subband basis may also be used to explore variation of multi-user (MU) patterns across the PUSCH assignment. MU may refer to multiple UEs using the same RB for transmission. MU may apply to some RBs, but not others. On different RBs, it may be desirable to select different precoders to match with the MU pattern.

The beamforming gain, however, may be improved at the expense of channel estimation processing gain. The BS may incur a loss as a result of the UE's use of the subband precoding. The BS typically performs channel estimation within a subband and channel estimation is typically not performed across different subbands. Because of the different precoders used in the transmission, joint channel estimation across multiple subbands can be difficult. Accordingly, the BS may lose channel estimation processing gain.

Another advantage of using subband precoding may provide for flexibility in configuring different precoders for different subbands in the PUSCH assignment. For example, based on a channel condition, different precoders may be selected or used for UL transmissions. With the flexibility of subband precoding, however, a large number of precoder-subband combinations may exist. Accordingly, when the BS signals a subband precoding configuration indicating a plurality of precoders of a plurality of subbands to the UE for a PUSCH assignment, the subband precoding may result in a large amount of signaling overhead. For example, the BS may transmit the precoding index information on a per-subband basis in the DCI. Accordingly, the subband precoding may result in a large amount of signaling overhead in the DCI. For example, for the BS to signal to the UE which precoders of a plurality of precoders to apply to which subbands of a plurality of subbands, the BS may signal four different indices or different precoders. In comparison, for the wideband precoding, the signaling by the BS is simple because only one index or precoder is used and applied to all RBs across the PUSCH transmission.

The present application provides mechanisms for reducing the signaling overhead by imposing one or more rules, constraints, or restrictions on precoder selections for UL subband precoding. In some examples, the BS transmits to the UE, a subband precoding configuration indicating a plurality of precoders for a plurality of subbands based on a transmit power parameter. In an example, the transmit power parameter may be a constant power spectral density (PSD). The PSD is the measure of a signal's power content versus frequency. For example, the PSD is the frequency response of a signal transmitted by the UE and may indicate where the average power is distributed as a function of frequency. Constant PSD may refer to the power of a signal being constant. A constant PSD restriction may avoid inter-mod/out-of-band emissions, effectively reducing the amount of adjacent band interference. The present application provides mechanisms for enabling the UE to transmit a communication signal in a plurality of subbands using a plurality of precoders, where the transmitted communication signal satisfies the transmit power parameter.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. ABS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as vehicle-to-vehicle (V2V) communications among the UEs 115*i*-115*k*, vehicle-to-everything (V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the SCS between adjacent subcarriers may be fixed, and the total number of subcarriers (K) may be dependent on the system BW. The system BW may also be partitioned into subbands. In other instances, the SCS and/or the duration of TTIs may be scalable.

In some aspects, the BSs 105 can assign or schedule transmission resources (e.g., in the form of time-frequency resource blocks (RB)) for DL and UL transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. A subframe may also be referred to as a slot. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information–reference signals (CSI-RSs) to enable a UE 115 to estimate a DL channel. Similarly, a UE 115 may transmit sounding reference signals (SRSs) to enable a BS 105 to estimate an UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI, OSI, and/or one or more system information blocks (SIBs). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant. In some aspects, the BS 105 may communicate with a UE 115 using HARQ techniques to improve communication reliability, for example, to provide a URLLC service.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities.

Figure 2:
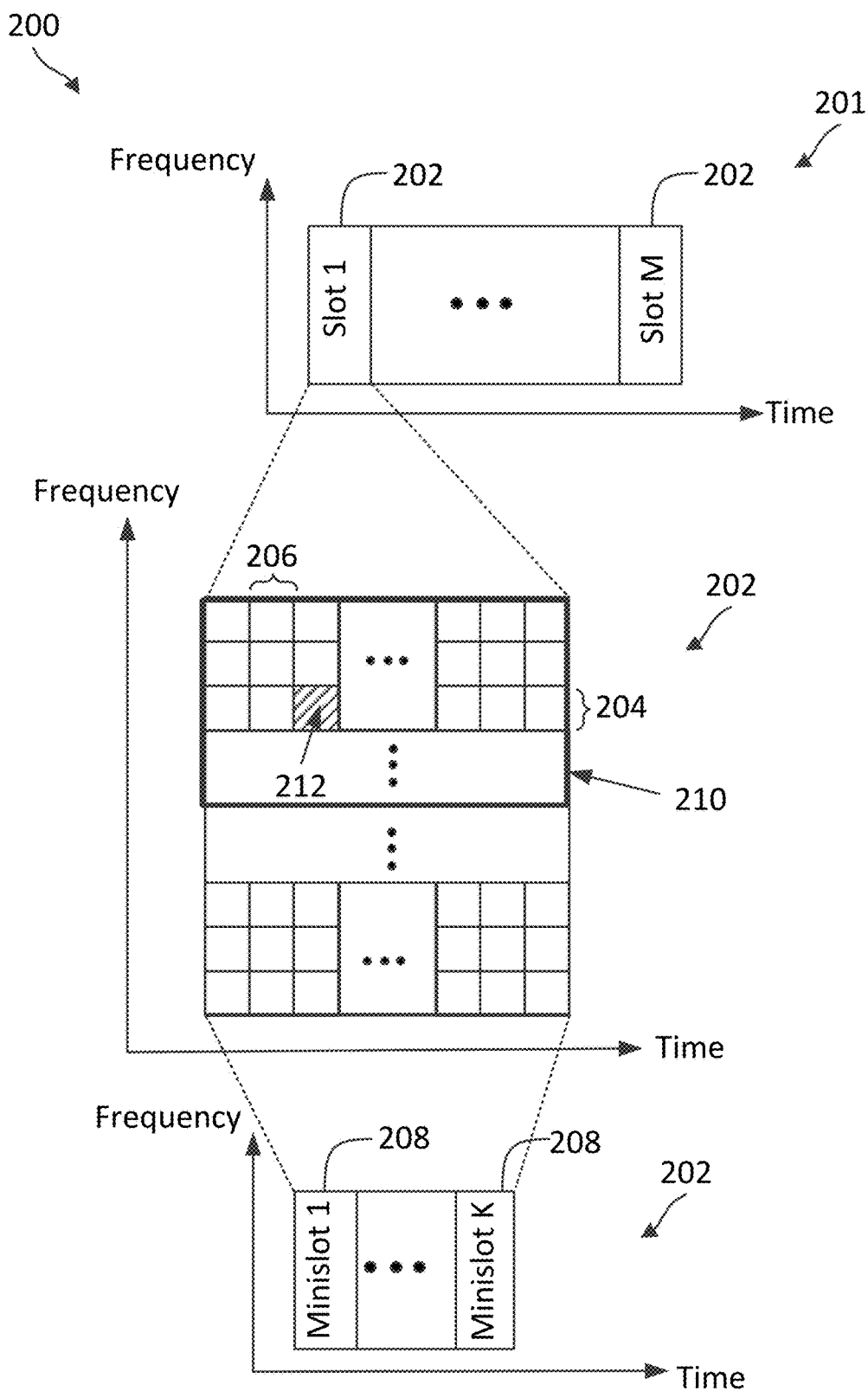
FIG. 2 is a timing diagram illustrating a transmission frame structure according to some aspects of the present disclosure.

FIG. 2 is a timing diagram illustrating a transmission frame structure 200 according to some aspects of the present disclosure. The transmission frame structure 200 may be employed by BSs such as the BSs 105 and UEs such as the UEs 115 in a network such as the network 100 for communications. In particular, the BS may communicate with the UE using time-frequency resources configured as shown in the transmission frame structure 200. In FIG. 2, the x-axes represent time in some arbitrary units, and the y-axes represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on, for example, the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a RB 210 (e.g., including about 12 subcarriers 204). A resource block group (RBG) may include one or more RBs and may also be referred to as a subband.

Figure 3:
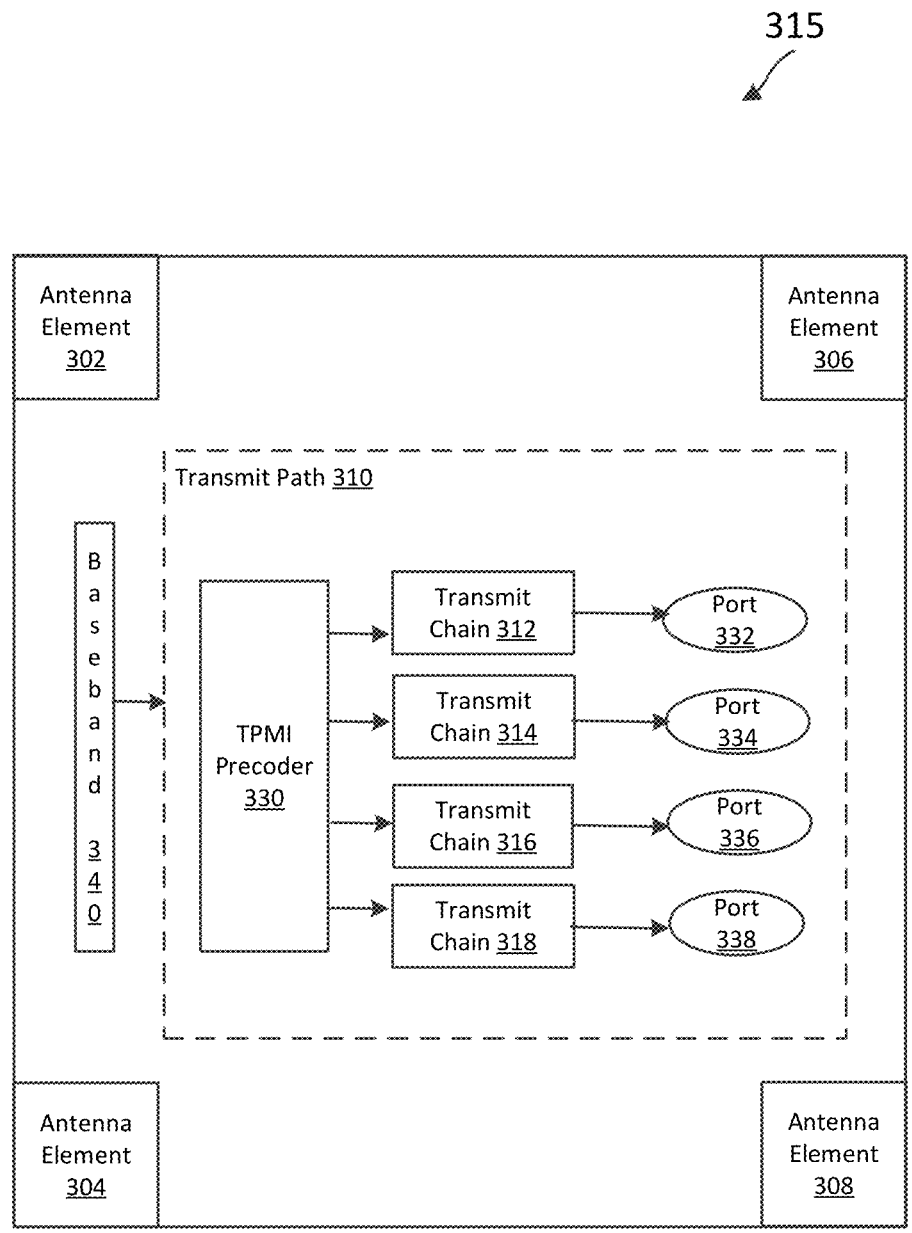
FIG. 3 illustrates an example of a user equipment (UE) according to some aspects of the present disclosure.

FIG. 3 illustrates an example of a UE 315 according to some aspects of the present disclosure. The UE 315 may be similar to the UEs 115 in FIG. 1 in the network 100. The UE 315 includes antenna elements 302, 304, 306, and 308. An antenna element may also be referred to as an antenna, an antenna port, or a port. Although the UE 315 is illustrated as having four antenna elements, it should be understood that in other examples, the UE 315 may include fewer antenna elements (e.g., 1, 2, or 3) or more antenna elements (e.g., 5, 6, 7, 8, etc.). A communication channel between a pair of nodes (e.g., a BS and a UE) includes not only the physical channel, but also radio frequency (RF) transceiver chains, for example, including antennas, low-noise amplifiers (LNAs), mixers, RF filters, and analog-to-digital (A/D) converters, and in-phase quadrature-phase (I/Q) imbalances, which may be different between different nodes and/or different antennas.

In the example illustrated in FIG. 3, the antenna elements 302, 304, 306, and 308 are located on different edges of the UE 315, thus creating diversity and providing for directional communication. The UE 315 may use at least one of the antenna elements 302, 304, 306, and/or 308 to transmit communication signals (e.g., SRS signals) to enable a BS (e.g., BS 105) to estimate an UL channel. The UE 315 includes a baseband 340 and a transmit path 310 for UL transmissions using one or more antenna elements. The baseband 340 may perform data encoding, cyclic-prefix (CP)-OFDM and/or discrete Fourier transform-spread-fast Fourier transform (DFT-s-FFT) modulation to generate a baseband signal. The transmit path 310 includes transmit chains 312, 314, 316, and 318. Although the UE 315 is illustrated as having four transmit chains, it should be understood that in other examples, the UE 315 may include fewer transmit chains (e.g., 1, 2, or 3) or more transmit chains (e.g., 5, 6, 7, 8, etc.). Each transmit chain may include a digital-to-analog converter (DAC), a mixer, and a power amplifier that converts a baseband signal to a radio frequency (RF) signal for transmission. Additionally, RF chains may be routed to multiple antennas, including all of the antennas, through phase shifters and/or switches. A transmit chain may also refer to an RF chain.

The UE 315 may sound a port 332, 334, 336, and/or 338 by sending an SRS using a combination of transmit chains. The ports 332, 334, 3236, and/or 338 may or may not have a one-to-one mapping to the antenna elements 302, 304, 306, and/or 308. When there is a one-to-one mapping, each antenna element 302, 304, 306, and/or 308 may map to one of the ports 332, 334, 336, and/or 338. When the ports 332, 334, 336, and/or 338 are logical ports or virtual ports, the UE may configure the transmit chains differently for different ports to produce signals with different powers and/or different direction. The UE can report a composite of the signals from the transmit chains to the BS as a virtual port by applying a transmit precoding matrix indicator (TPMI) precoder 330. Although the TPMI precoder 330 is illustrated in relation to the transmit chains, the TPMI precoder 330 may be applied in the baseband 340.

The network in which the UE 315 operates may support three levels of coherence capabilities of a UE: full, partial, and non-coherent. A UE with full coherence may be referred to as a fully coherent UE and can transmit coherently over all antenna ports. A fully coherent UE can control the relative phase between all transmit chains 312, 314, 316, and 318 of the UE. In other words, a fully coherent UE is capable of maintaining a relative phase across all the antenna elements 302, 304, 306, and 308 of the UE. Two antenna elements maintain a relative phase if the phases across these two antennas are locked and/or remain the same across UL transmissions. Each of the antenna elements in a fully coherent UE may, for example, be driven by the same RF module that maintains a relative phase across each of them.

A UE with partial coherence may be referred to as a partially coherent UE and can transmit coherently over pairs of antenna ports. A partially coherent UE is capable of maintaining a relative phase across multiple subsets of the antenna elements 302, 304, 306, and 308. In an example, a first pair of antenna elements 302 and 306 may be referred to as coherent antennas relative to each other and may be driven by a first common RF module that maintains a relative phase across these two antenna elements. Additionally, a second pair of the antenna elements 304 and 308 may be referred to as coherent antennas relative to each other and may be driven by a second common RF module that maintains a relative phase across these two antenna elements. The first pair of antenna elements 302 and 306 may operate to some extent independent from the second pair of antenna elements 304 and 308 because these two pairs are driven by different RF modules. The UE may be unable to maintain phase coherence across these two pairs.

A UE with non-coherence may be referred to as a non-coherent UE and may not be able to transmit coherently over any pairs or sets of antenna ports. For example, the non-coherence UE may not be capable of maintaining a relative phase across any of the antenna elements 302, 304, 306, and 308.

In conventional wideband precoding, the UE applies only one precoder ("a common precoder") for all subbands across the PUSCH assignment. In subband precoding, the UE may apply a plurality of precoders for a plurality of subbands across the PUSCH assignment. The BS may transmit to the UE, a subband precoding configuration indicating a plurality of precoders for a plurality of subbands. The BS may configure the transform precoding by disabling or enabling it. A TPMI index or a matrix W may indicate the precoder for the UE to apply for a subband.

Figure 4:
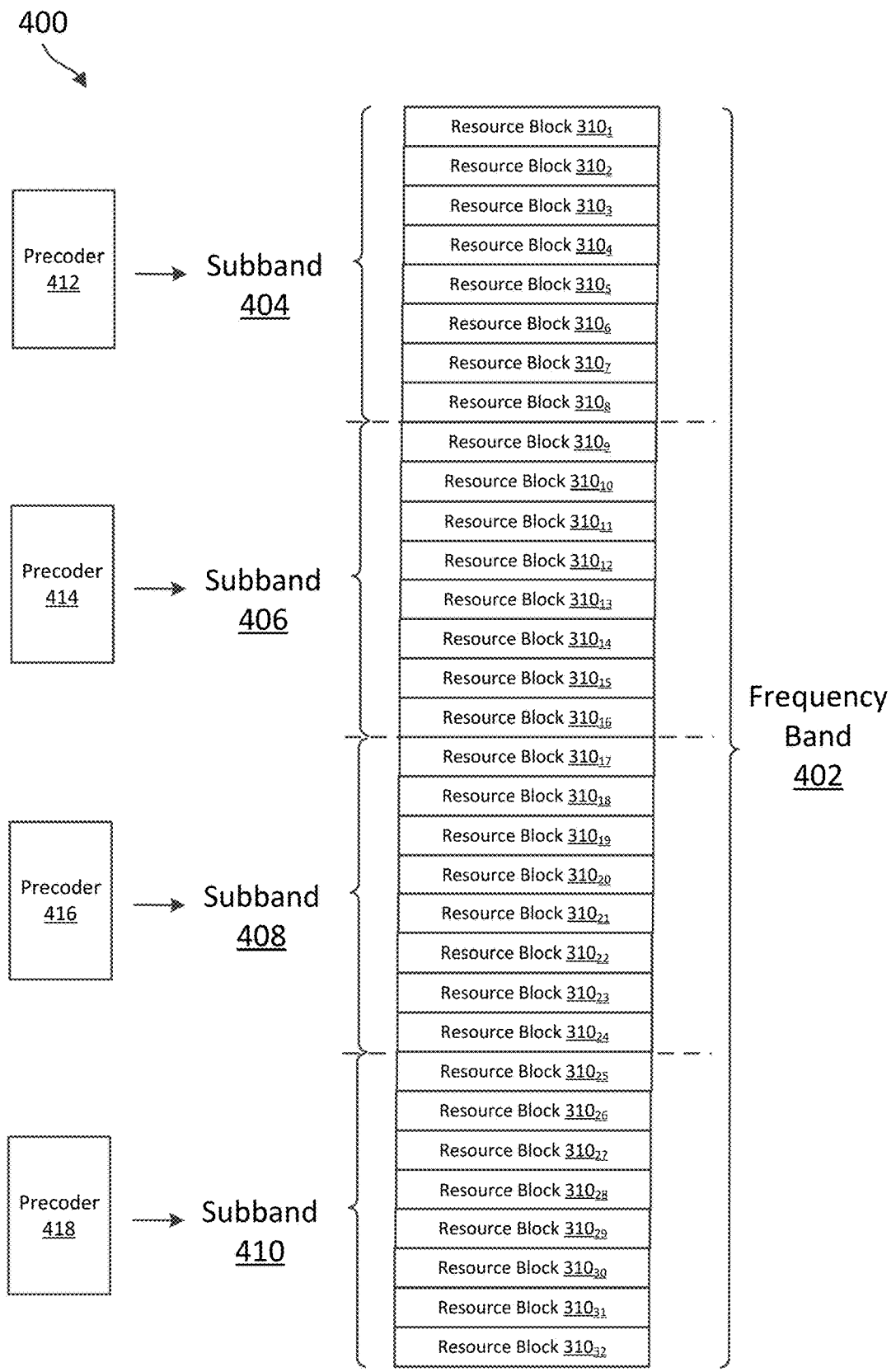
FIG. 4 illustrates an uplink (UL) subband precoding configuration scheme according to some aspects of the present disclosure.

FIG. 4 illustrates an UL subband precoding configuration scheme 400 according to some aspects of the present disclosure. The scheme 400 may be employed by UEs such as the UEs 115, 315 and BSs such as the BSs 105 in a network such as the network 100. In FIG. 4, a frequency band 402 includes thirty-two RBs $310_1$, $310_2$, ... $310_{32}$, and the BS assign a PUSCH allocation including the thirty-two RBs to the UE for UL transmissions. The BS may partition the frequency band 402 into a plurality of subbands including subbands 404, 406, 408, and 410. Each of the subbands 404, 406, 408, and 410 includes eight RBs 310. For example, subband 404 includes RBs $310_1$, $310_2$, ... $310_8$, subband 406 includes RBs $310_9$, $310_{10}$, ... $310_{16}$, subband 408 includes RBs $310_{17}$, $310_{18}$, ... $310_{24}$, and subband 410 includes RBs $310_{25}$, $310_{26}$, ... $310_{32}$. Each subband can include any suitable number of RBs.

The BS may determine a subband precoding configuration indicating a plurality of precoders (e.g., precoders 412, 414, 416, and 418) for a plurality of subbands (e.g., subbands 404, 406, 408, and 410), and each precoder of the plurality of precoders is configured for one subband of the plurality of subbands. In an example, the BS configures each precoder of the plurality of precoders for one subband of the plurality of subbands by transmitting the subband precoding configuration to the UE. The subband precoding configuration may indicate that the precoder 412 should be used for UL communications in the subband 404, the precoder 414 should be used for UL communications in the subband 406, the precoder 416 should be used for UL communications in the subband 408, and the precoder 418 should be used for UL communications in the subband 410.

The UE receives the subband precoding configuration. For each subband of the plurality of subbands, the UE may determine, based on the subband precoding configuration, a precoder of the plurality of precoders to use for the respective subband. A precoder corresponds to a subband if the UE determines, based on the subband precoding configuration, that the precoder is to be used in the subband. The UE may then transmit a communication signal in the plurality of subbands using the plurality of precoders, where the UE applies different precoders for different subbands in a frequency domain for the generation. For example, the UE may transmit a communication signal in the frequency band 402 by applying a precoder corresponding to each subband. In this regard, the UE may generate the communication signal by applying the precoder 412 to modulation symbols and/or DMRS symbols that are mapped to the subband 404, applying the precoder 414 to modulation symbols and/or DMRS symbols that are mapped to the subband 406, applying the precoder 416 to modulation symbols and/or DMRS symbols that are mapped to the subband 408, and applying the precoder 418 to modulation symbols and/or DMRS symbols that are mapped to the subband 410.

With the flexibility of subband precoding, a large number of precoder-subband combinations may exist for the subband precoding configuration. To reduce the signaling overhead when the BS signals the subband precoding configuration to the UE, the number of precoder-subband combinations may be reduced in accordance with a transmit power parameter. The transmit power parameter may be, for example, a constant PSD. The PSD is the measure of a signal's power content versus frequency. For example, the PSD is the frequency response of a signal transmitted by the UE and may indicate where the average power is distributed as a function of frequency. Constant PSD may refer to the power of a signal being constant across frequency. A constant PSD restriction may avoid inter-mod/out-of-band emissions, effectively reducing the amount of adjacent band interference.

If a UE has a single antenna port, the UE may transmit a communication signal in a plurality of subbands using the same precoder across all RBs. Such transmission results in a constant PSD. With subband precoding, however, different combinations of precoders for different subbands may result in different PSDs. A combination of precoders resulting in a non-constant PSD may be undesirable. For example, a non-constant PSD may cause adjacent band interference. Additionally, the BS may filter out or exclude those precoder combinations that result in a non-constant PSD to reduce the overall number of possible precoder combinations within a subband precoding configuration and accordingly its signaling overhead.

FIGS. 5 and 6 illustrates examples of subband precoding communication schemes that result in a non-constant PSD for an UL communication signal. FIG. 5 illustrates an example subband precoding communication scheme 500 that results in a non-constant PSD for an UL communication signal. The x-axis represents frequency in some arbitrary units. FIG. 5 will be discussed in relation to FIG. 3 to better understand some concepts of the disclosure. In FIG. 5, TX 0 refers to the transmission energy from the UL transmission on the antenna element 302 of the UE 315 in FIG. 3, and TX 1 refers to the transmission energy from the UL transmission on the antenna element 304 of the UE 315. Additionally, a subband precoding configuration 501 indicates precoders 512, 514, 516, and 518 for subbands 504, 506, 508, and 510, respectively. In the precoders 512, 514, 516, and 518, the first row may correspond to a transmission using the antenna element 302, the second row may correspond to a transmission using the antenna element 304, the third row may correspond to a transmission using the antenna element 306, and the fourth row may correspond to a transmission using the antenna element 308. A first value (e.g., "0") in a matrix or precoder may indicate that the antenna element corresponding to the first value is not used for an UL transmission. A second value (e.g., "1") different from the first value in the matrix may indicate that the antenna element corresponding to the second value is used for the UL transmission.

When the UE transmits a communication signal in the subband 504 using the precoder 512

$$\begin{bmatrix} 1 \\ 0 \\ 0 \\ 0 \end{bmatrix},$$

all the transmission energy is used on the antenna element 302. When the UE transmits a communication signal in the subband 506 using the precoder 514

$$\begin{bmatrix} 0 \\ 1 \\ 0 \\ 0 \end{bmatrix},$$

all the transmission energy is used on the antenna element 304. When the UE transmits a communication signal in the subband 508 using the precoder 516

$$\begin{bmatrix} 1 \\ 0 \\ 0 \\ 0 \end{bmatrix},$$

all the transmission energy is used on the antenna element 302. When the UE transmits a communication signal in the subband 510 using the precoder 518

$$\begin{bmatrix} 0 \\ 1 \\ 0 \\ 0 \end{bmatrix},$$

all the transmission energy is used on the antenna element 304.

As shown in FIG. 5, the transmission energy for TX 0 corresponding to the antenna element 302 has an "ON-OFF" pattern. The transmission energy of an antenna element is referred to as "ON" if the UE transmits a communication signal using the antenna element for an UL transmission. Conversely, the transmission energy of an antenna element is referred to as "OFF" if the UE transmits a communication signal without using the antenna element for the UL transmission. For example, the transmission energy is "ON" (UL transmission using the antenna element 302) in the subband 504, then the transmission energy is "OFF" (UL transmission without using the antenna element 302) in the subband 506, then the transmission energy is "ON" in the subband 508, then the transmission energy is "OFF" in the subband 510. For TX 1 corresponding to the antenna element 304, the energy on the antenna element also has an "ON-OFF" pattern. For example, the transmission energy is "OFF" in the subband 504, then the transmission energy is "ON" in the subband 506, then the transmission energy is "OFF" in the subband 508, then the transmission energy is "ON" in the subband 510.

The precoding combinations provided in the subband precoding configuration 501 may result in a non-constant PSD. The "ON-OFF" pattern may create an issue on a per-antenna basis because each energy transmission will have an out-of-band emission. Accordingly, it may be desirable to select a subband precoding configuration that results in a constant PSD rather than a non-constant PSD to reduce the amount of adjacent band interference.

FIG. 6 illustrates an example subband precoding communication scheme 600 that results in a non-constant PSD for an UL communication signal. The x-axis represents frequency in some arbitrary units. FIG. 6 will be discussed in relation to FIG. 3 to better understand some concepts of the disclosure. In FIG. 6, TX 0 refers to the transmission energy from the UL transmission on the antenna element 302 of the UE 315 in FIG. 3. Additionally, a subband precoding configuration 601 indicates precoders 612 and 614 for subbands 604 and 606, respectively. In the precoders 612 and 614, the first row may correspond to a transmission using the antenna element 302, the second row may correspond to a transmission using the antenna element 304, the third row may correspond to a transmission using the antenna element 306, and the fourth row may correspond to a transmission using the antenna element 308.

When the UE transmits a communication signal in the subband 604 using the precoder 612

$$\begin{bmatrix} 1 \\ 0 \\ 1 \\ 0 \end{bmatrix},$$

the total transmission energy based on the UL transmission is split between the two antenna elements 202 and 206. Accordingly, such transmission uses one-half of the total energy per-element 202 and 206, because the other two antenna elements 204 and 206 are not used. When the UE transmits a communication signal in the subband 606 using the precoder 614

$$\begin{bmatrix} 1 \\ 1 \\ 1 \\ 1 \end{bmatrix},$$

the total transmission energy based on the UL transmission is split between the four antenna elements 202, 204, 206, and 208. Accordingly, such transmission uses one-fourth of the total energy per-antenna element because all four antenna elements are used.

As shown in FIG. 6, for TX 0 corresponding to the antenna element 302, the first transmission in the subband 604 uses two antenna elements and accordingly uses one-half of the total transmission energy via the antenna element 302. Additionally, the second transmission in the subband 606 uses four antenna elements and accordingly uses one-fourth of the total transmission energy via the antenna element 302.

The precoder combinations provided in the subband precoding configuration 601 may result in a non-constant PSD and each energy transmission will have an out-of-band emission. The unequal distribution of power over the frequency range may create an issue on a per-antenna basis or on an aggregate antenna basis because each energy transmission will have an out-of-band emission. Accordingly, it may be desirable to select a plurality of precoders for a plurality of subbands that maintains a constant PSD rather than a non-constant PSD. For example, a non-constant PSD may cause adjacent band interference. Additionally, the BS may filter out those precoder combinations that result in a non-constant PSD to reduce the overall number of possible precoder combinations within a subband precoding configuration and accordingly its signaling overhead.

The BS may filter out precoder combinations by imposing a set of rules. A rule may specify that the combination of precoders selected for inclusion in a subband precoding configuration result in a constant PSD. For example, if a UE has more than one antenna port, the BS may apply a set of rules for determining the subband precoding configuration based on the constant PSD. The set of rules may exclude some precoders from being included in the subband precoding configuration.

The network may support non-coherent precoders, partially coherent precoders, and/or fully coherent precoders. If the UE uses a non-coherent precoder, the UE may be incapable of maintaining a relative phase between antenna ports of the UE. If the UE uses a partially coherent precoder, the UE may be capable of maintaining a relative phase between multiple sets of antenna ports of the UE. If the UE uses a fully coherent precoder, the UE may be capable of maintaining a relative phase between all antenna ports of the UE.

The BS transmits to the UE, a subband precoding configuration indicating a plurality of precoders for a plurality of subbands based on a transmit power parameter, where each precoder of the plurality of precoders is configured for one subband of the plurality of subbands. The UE receives the subband precoding configuration and for each subband of the plurality of subbands, the UE determines the correct precoder of the plurality of precoders to use. The UE transmits to the BS, a communication signal in the plurality of subbands using the plurality of precoders. The BS receives the communication signal, which satisfies the transmit power parameter.

The NR network may support two types of UL data transmissions. The first type of supported UL data transmission may be grant-based PUSCH, which may also be referred to as a dynamic-grant PUSCH. The second type of supported UL data transmission may be grant-free PUSCH, which may also be referred to as configured-grant PUSCH. The precoder restrictions (e.g., the constant PSD, the non-coherent precoders, partially coherent precoders, and/or fully coherent precoders) may apply to both types of PUSCH transmissions. In some examples, the DCI aspect may apply only to a grant-based PUSCH. In some examples, for configured-grant PUSCH, the precoding information and resource allocation (e.g., subband size and/or number of subbands) are configured via RRC signal. The UE may transmit the communication signal in the plurality of subbands using the plurality of precoders, where the communication signal is a PUSCH transmission with a configured grant. In this example case, the number of subbands, the subband size, and/or the precoders for each subband may be received via RRC signaling (instead of DCI), which may configure the PUSCH transmission with a configured grant.

FIGS. 7-12 are tables of codebook subsets that may be used in different scenarios and indicate scaling factors for power transmission. The precoders and the scaling factor depend on, for example, the number of layers in the UL transmission, the number of antenna ports of the UE, and whether the transform precoding is enabled or disabled. The tables include a "TPMI index" column and a precoder matrix "W" column. A TPMI index may reference or indicate a matrix W, which may represent a precoder, and the matrices W are ordered from left to right in increasing order of TPMI index. In the present disclosure, the term "matrix" may be used interchangeably with the term "precoder."

Additionally, FIGS. 7-12 may be discussed in relation to FIG. 3 to better understand some concepts of the present disclosure. In a matrix W, a first row corresponds to a first antenna port of the UE 315 (e.g., the antenna element 302), a second row corresponds to a second antenna port of the UE 315 (e.g., antenna element 304), a third row corresponds to a third antenna port of the UE 315 (e.g., antenna element 306), and a fourth row corresponds to a fourth antenna port of the UE 315 (e.g., antenna element 308). Additionally, the number of columns in the matrix W corresponds to the number of layers. For example, a precoding matrix with a single column corresponds to a single-layer transmission, a precoding matrix with two columns corresponds to a two-layer transmission, a precoding matrix with three columns corresponds to a three-layer transmission, and a precoding matrix with four columns corresponds to a four-layer transmission, where the first column corresponds to the first layer, the second column corresponds to the second layer, the third column corresponds to the third layer, and the fourth column corresponds to the fourth layer. Moreover, a first value (e.g., "0") in a matrix may indicate that the antenna element corresponding to the first value is not used for an UL transmission. A second value (e.g., "1") different from the first value in the matrix may indicate that the antenna element corresponding to the second value is used for the UL transmission.

The BS may apply a set of rules to a codebook set in, for example, FIGS. 7-12 to exclude a number of precoder combinations as discussed below, thus reducing the signaling overhead for signaling the subband precoding configuration to the UE. The plurality of precoders indicated in the subband precoding configuration may be based on a UE capability of the UE. The UE capability may based on whether the UE is a fully coherent, partially coherent, or non-coherent UE.

FIG. 7 is a table 700 of a codebook subset storing a precoding matrix W for single-layer transmission for a UE having two antenna ports according to some aspects of the present disclosure. The table 700 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A.

Appendix A provides more details regarding the bit fields-to-index mappings per-subband, for single-layer, two-layer, three-layer, and/or four-layer transmissions and a UE having two and four antenna ports. It should be understood that in Appendix A, some abbreviations are used. For example, "2TX" may refer to two antenna ports, "4TX" may refer to four antenna ports, "L1F" may refer to a single-layer transmission and fully coherent precoders, "L1PA" may refer to a single-layer transmission and a first set of partially coherent precoders, "L1PA" may refer to a single-layer transmission and a first set of partially coherent precoders (e.g., first set of partially coherent precoders 904 in FIG. 9), "L1PB" may refer to a single-layer transmission and a second set of partially coherent precoders (e.g., second set of partially coherent precoders 906 in FIG. 9), "L2F" may refer to a two-layer transmission and fully coherent precoders, "L2P" may refer to a two-layer transmission and partially coherent precoders, "L3F" may refer to a three-layer transmission and fully coherent precoders, "L3P" may refer to a three-layer transmission and partially coherent precoders, "L4F" may refer to a four-layer transmission and fully coherent precoders, "L4P" may refer to a four-layer transmission and partially coherent precoders, "L1" may refer to a single-layer transmission, and "L2" may refer to a two-layer transmission.

In the table 700, the number of transmission ports is two, and the number of layers for PUSCH is one. Additionally, the scaling factor for power transmission is $$"\frac{1}{\sqrt{2}}",$$

a set or non-coherent precoders 702 includes the first two matrices, and a set of fully coherent precoders 704 includes the remaining four matrices.

If the UE transmits a communication signal using a non-coherent precoder corresponding to the matrix $$\begin{bmatrix}1\\0\end{bmatrix}$$

(indicated by TPMI index 0) and transmits a communication signal using a non-coherent precoder corresponding to the matrix $$\begin{bmatrix}0\\1\end{bmatrix}$$

(indicated by TPMI index 1), the use of such non-coherent precoders may result in a non-constant PSD shown by the "ON-OFF" pattern discussed above (see FIG. 5).

A non-coherent precoder rule for UL subband precoding may specify that non-coherent precoders cannot be used for subband precoding except when the number of transmission ports (e.g., antenna ports) is equal to the number of layers for PUSCH. If the number of transmission ports is the same as the number of layers for PUSCH, each signal is for a different layer and accordingly the phase between the antennas becomes immaterial.

In the table 700, the number of transmission ports (two) is not equal to the number of layers for PUSCH (one). Accordingly, the set of non-coherent precoders 702 is excluded from the plurality of precoders indicated in the subband precoding configuration. Additionally, one or more fully coherent precoders of the set of fully coherent precoders 704 may be included in the plurality of precoders indicated in the subband precoding configuration. Accordingly, for a single-layer PUSCH transmission for a UE having two antenna ports, only fully coherent precoders may be used for subband precoding for the PUSCH. Such a subband precoding configuration results in a constant PSD.

The BS determines a subband precoding configuration based on a transmit power parameter (e.g., constant PSD). In an example, the BS may transmit a subband precoding configuration indicating fully coherent precoders of the set of fully coherent precoders 704 for a plurality of subbands, but not indicating any non-coherent precoders. The UE receives the subband precoding configuration and may transmit a communication signal in the plurality of subbands using the fully coherent precoders indicated in the subband precoding configuration, the transmitted communication signal satisfying the constant PSD. In an example, the UE has two antenna ports for PUSCH transmission, and for a single-layer transmission, the plurality of precoders is devoid of non-coherent precoders and further devoid of partially coherent precoders. For the single-layer transmission, the plurality of precoders may include only fully coherent precoders. Accordingly, the transmitted communication signal may satisfy the constant PSD. The BS receives the communication signal from the UE.

FIG. 8 is a table 800 of a codebook subset storing a precoding matrix W for two-layer transmission for a UE having antenna ports, with transform precoding disabled, according to some aspects of the present disclosure. If the transform precoding is disabled, the transmitted waveform corresponds to CP-OFDM. The table 800 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A. Additionally, the scaling factor for power transmission is $$"\frac{1}{\sqrt{2}}"$$

for a set of non-coherent precoders 802 and is "½" for a set of fully coherent precoders 804. The set of non-coherent precoders 802 includes the first matrix (indicated by TPMI index 0), and the set of fully coherent precoders 804 includes the remaining two matrices (indicated by TPMI indices 1-2).

The non-coherent precoder rule may specify that non-coherent precoders cannot be used for subband precoding except when the number of transmission ports is equal to the number of layers for PUSCH. In the table 800, the number of transmission ports (two) is equal to the number of layers for PUSCH (two). Based on the exception provided in the non-coherent precoder rule, the set of non-coherent precoders 802 may be included in the plurality of precoders indicated in the subband precoding configuration. Additionally, a rule may specify that one or more fully coherent precoders of the set of fully coherent precoders 704 may be included in the plurality of precoders indicated in the subband precoding configuration. Accordingly, for a two-layer PUSCH transmission for a UE having two antenna ports, both non-coherent and fully coherent precoders may be used for subband precoding for the PUSCH. Such a subband precoding configuration results in a constant PSD.

In an example, the BS may transmit a subband precoding configuration indicating one or more non-coherent precoders of the set of non-coherent precoders 802 and/or indicating one or more fully coherent precoders of the set of fully coherent precoders 804 for a plurality of subbands. The UE receives the subband precoding configuration and may transmit a communication signal in the plurality of subbands using the non-coherent and/or fully coherent precoders indicated in the subband precoding configuration, the transmitted communication signal satisfying the constant PSD. In an example, the UE has two antenna ports for PUSCH transmission, and for a two-layer transmission, the plurality of precoders includes one or more fully coherent precoders, one or more partially coherent precoders, or one or more non-coherent precoders. Accordingly, the transmitted communication signal may satisfy the constant PSD. The BS receives the communication signal from the UE.

Figure 9:
FIG. 9 is a table of a codebook subset storing a precoding matrix W for a single-layer transmission for a UE having four antenna ports according to some aspects of the present disclosure.

FIG. 9 is a table 900 of a codebook subset storing a precoding matrix W for a single-layer transmission for a UE having four antenna ports, with transform precoding disabled, according to some aspects of the present disclosure. If the transform precoding is disabled, the transmitted waveform corresponds to CP-OFDM. The table 900 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A. Additionally, the scaling factor for power transmission is "½", a set of non-coherent precoders 902 includes the first four matrices (indicated by TPMI indices 0-3), a first set of partially coherent precoders 904 includes the next four matrices (indicated by TPMI indices 4-7), a second set of partially coherent precoders 906 includes the next four matrices (indicated by TPMI indices 8-11), and a set of fully coherent precoders 908 includes the remaining sixteen matrices (indicated by TPMI indices 12-27).

The non-coherent precoder rule may specify that non-coherent precoders cannot be used for subband precoding except when the number of transmission ports is equal to the number of layers for PUSCH. In the table 900, the number of transmission ports (four) is not equal to the number of layers for PUSCH (one). Accordingly, the set of non-coherent precoders 902 is excluded from the plurality of precoders indicated in the subband precoding configuration.

For a single-layer transmission for a UE having four antenna ports, a rule for UL subband precoding may specify that partially coherent precoders and fully coherent precoders cannot be simultaneously used for subband precoding for the same PUSCH transmission. If the UE uses partially coherent precoders and fully coherent precoders for subband precoding for the same PUSCH transmission, the precoding combination may result in a non-constant PSD. Accordingly, if any partially coherent precoders of the first set of partially coherent precoders 904 or of the second set of partially coherent precoders 906 are included in a plurality of precoders indicated in the subband precoding configuration, then no fully coherent precoders of the set of fully coherent precoders 908 are included in the plurality of precoders. Conversely, if any fully coherent precoders of the set of fully coherent precoders 908 are included in a plurality of precoders indicated in the subband precoding configuration, then no partially coherent precoders are included in the plurality of precoders.

For a single-layer transmission for a UE having four antenna ports, another rule for UL subband precoding may specify that partially coherent precoders included in the first set of partially coherent precoders 904 and partially coherent precoders included in the second set of partially coherent precoders 906 cannot be used simultaneously for subband precoding for the same PUSCH transmission. If the UE uses partially coherent precoders in the first set of partially coherent precoders 904 and the second set of partially coherent precoders 906 for subband precoding in the same PUSCH transmission, the precoding combination may result in a non-constant PSD because a pair of "ON" antenna ports in the first set of partially coherent precoders 904 and a pair of "ON" antenna ports in the second set of partially coherent precoders 906 are not coherent. Accordingly, if any partially coherent precoders of the first set of partially coherent precoders 904 are included in a plurality of precoders indicated in the subband precoding configuration, then no partially coherent precoders of the second set of partially coherent precoders 906 are included in the plurality of precoders. Conversely, if any partially coherent precoders of the second set of partially coherent precoders 906 are included in a plurality of precoders indicated in the subband precoding configuration, then no partially coherent precoders of the first set of partially coherent precoders 904 are included in the plurality of precoders.

One or more rules may be combined for determining the subband precoding configuration based on a transmit power parameter. In an example, the BS may transmit a subband precoding configuration indicating one of either partially coherent precoders or fully coherent precoders for a plurality of subbands. In this example, if the subband precoding configuration indicates partially coherent precoders, the subband precoding configuration indicates one of either the first set of partially coherent precoders 904 or the second set of partially coherent precoders 906 for the plurality of subbands. The UE receives the subband precoding configuration and may transmit a communication signal in the plurality of subbands using the precoders indicated in the subband precoding configuration, where the transmitted communication signal satisfies the constant PSD. In an example, the UE has four antenna ports for PUSCH transmission, and for a single-layer transmission, the plurality of precoders is devoid of non-coherent precoders. For the single-layer transmission, the plurality of precoders includes one of either a set of fully coherent precoders or a set of partially coherent precoders. Additionally, the set of partially coherent precoders includes a first subset of partially coherent precoders and a second subset of partially coherent precoders, and if the plurality of precoders includes the set of partially coherent precoders, the plurality of subbands includes one of either the first subset or the second subset. Accordingly, the transmitted communication signal may satisfy the constant PSD. The BS receives the communication signal from the UE.

FIG. 10 is a table 1000 of a codebook subset storing a precoding matrix W for two-layer transmission for a UE having four antenna ports, with transform precoding disabled, according to some aspects of the present disclosure. If the transform precoding is disabled, the transmitted waveform corresponds to CP-OFDM. The table 1000 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A. In the table 1000, the number of transmission ports is four, and the number of layers for PUSCH is two. Additionally, the scaling factor for power transmission is "½" for a set of non-coherent precoders 1004 and for a set of partially coherent precoders 1006, and is $$"\frac{1}{2\sqrt{2}}"$$

for a set of fully coherent precoders 1008. The set of non-coherent precoders 1004 includes the first six matrices (indicated by TPMI indices 0-5), the set of partially coherent precoders 1006 includes the next eight matrices (indicated by TPMI indices 6-13), and the set of fully coherent precoders 1008 includes the remaining eight matrices (indicated by TPMI indices 14-21).

Figure 11:
FIG. 11 is a table of a codebook subset storing a precoding matrix W for three-layer transmission for a UE having four antenna ports according to some aspects of the present disclosure.

FIG. 11 is a table 1100 of a codebook subset storing a precoding matrix W for three-layer transmission for a UE having four antenna ports, with transform precoding disabled, according to some aspects of the present disclosure. If the transform precoding is disabled, the transmitted waveform corresponds to CP-OFDM. The table 1100 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A. In the table 1100, the number of transmission ports is four, and the number of layers for PUSCH is three. Additionally, the scaling factor for power transmission is "½" for a set of non-coherent precoders 1102 and for a set of partially coherent precoders 1104 and is $$"\frac{1}{2\sqrt{3}}"$$

for a set of fully coherent precoders 1106. The set of non-coherent precoders 1102 includes the first matrix (indicated by TPMI index 0), the set of partially coherent precoders 1104 includes the next two matrices (indicated by TPMI indices 1 and 2), and the set of fully coherent precoders 1106 includes the remaining four matrices (indicated by TPMI indices 3-6).

The non-coherent precoder rule may specify that non-coherent precoders cannot be used for subband precoding except when the number of transmission ports is equal to the number of layers for PUSCH. In FIG. 10, the number of transmission ports (four) is not the same as the number of layers for PUSCH (two), and in FIG. 11, the number of transmission ports (four) is not the same as the number of layers for PUSCH (three). Accordingly, for a two-layer transmission (FIG. 10) or a three-layer transmission (FIG. 11) using a UE having four antenna ports, non-coherent precoders are excluded from the plurality of precoders indicated in the subband precoding configuration based on a constant PSD.

Additionally, for a two-layer transmission (FIG. 10) or a three-layer transmission (FIG. 11) using a UE having four antenna ports, a rule for UL subband precoding may specify that both partially coherent and fully coherent precoders may be used simultaneously for subband precoding for the same PUSCH transmission. For example, in FIG. 10, one or more partially coherent precoders of the set of partially coherent precoders 1006 and/or one or more fully coherent precoders of the set of fully coherent precoders 1008 may be included in a plurality of precoders indicated in the subband precoding configuration. In another example, in FIG. 11, one or more partially coherent precoders of the set of partially coherent precoders 1104 and/or one or more fully coherent precoders of the set of fully coherent precoders 1106 may be included in a plurality of precoders indicated in the subband precoding configuration.

In an example, the BS may transmit a subband precoding configuration indicating one or more partially coherent precoders and/or indicating one or more fully coherent precoders for a plurality of subbands. The UE receives the subband precoding configuration and may transmit a communication signal in the plurality of subbands using the partially coherent and/or fully coherent precoders indicated in the subband precoding configuration, the transmitted communication signal satisfying the constant PSD. In an example, the UE has four antenna ports for PUSCH transmission, and for a two-layer or a three-layer transmission, the plurality of precoders is devoid of non-coherent precoders. In this example, the plurality of precoders may include one or more fully coherent precoders or one or more partially coherent precoders. Accordingly, the transmitted communication signal may satisfy the constant PSD. The BS receives the communication signal from the UE.

Figure 12:
FIG. 12 is a table of a codebook subset storing a precoding matrix W for a four-layer transmission for a UE having four antenna ports according to some aspects of the present disclosure.

FIG. 12 is a table 1200 of a codebook subset storing a precoding matrix W for a four-layer transmission for a UE having four antenna ports, with transform precoding disabled, according to some aspects of the present disclosure. If the transform precoding is disabled, the transmitted waveform corresponds to CP-OFDM. The table 1200 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A. Additionally, the scaling factor for power transmission is "½" for a set of non-coherent precoders 1202, is $$"\frac{1}{2\sqrt{2}}"$$

for a set of partially coherent precoders 1204, and is "¼" for a set of fully coherent precoders 1206. The set of non-coherent precoders 1202 includes the first matrix (indicated by TPMI index 0), the set of partially coherent precoders 1204 includes the next two matrices (indicated by TPMI indices 1 and 2), and the set of fully coherent precoders 1206 includes the remaining two matrices (indicated by TPMI indices 3 and 4).

The non-coherent precoders rule may specify that non-coherent precoders cannot be used for subband precoding except when the number of transmission ports is equal to the number of layers for PUSCH. In the table 1200, the number of transmission ports (four) is equal to the number of layers for PUSCH (four). Based on the exception provided in the non-coherent precoder rule, the set of non-coherent precoders 1202 may be included in the plurality of precoders indicated in the subband precoding configuration. Additionally, a rule may specify that one or more partially coherent precoders of the set of partially coherent precoders 1204 and/or one or more fully coherent precoders of the set of fully coherent precoders 1206 may be included in the plurality of precoders indicated in the subband precoding configuration. Accordingly, for a four-layer PUSCH transmission for a UE having four antenna ports, all precoders (e.g., non-coherent, partially coherent, and fully coherent precoders) may be used for subband precoding for the same PUSCH transmission. Such a subband precoding configuration results in a constant PSD.

In an example, the BS may transmit a subband precoding configuration indicating one or more non-coherent precoders of the set of non-coherent precoders 1202, one or more partially coherent precoders of the set of partially coherent precoders 1204, and/or one or more fully coherent precoders of the set of fully coherent precoders 1206 for a plurality of subbands. The UE receives the subband precoding configuration and may transmit a communication signal in the plurality of subbands using the precoders indicated in the subband precoding configuration, where the transmitted communication signal satisfies the constant PSD. In an example, the UE has four antenna ports for PUSCH transmission, and for a four-layer transmission, the plurality of precoders includes one or more fully coherent precoders, one or more partially coherent precoders, or one or more non-coherent precoders. Accordingly, the transmitted communication signal may satisfy the constant PSD. The BS receives the communication signal from the UE.

Figure 13:
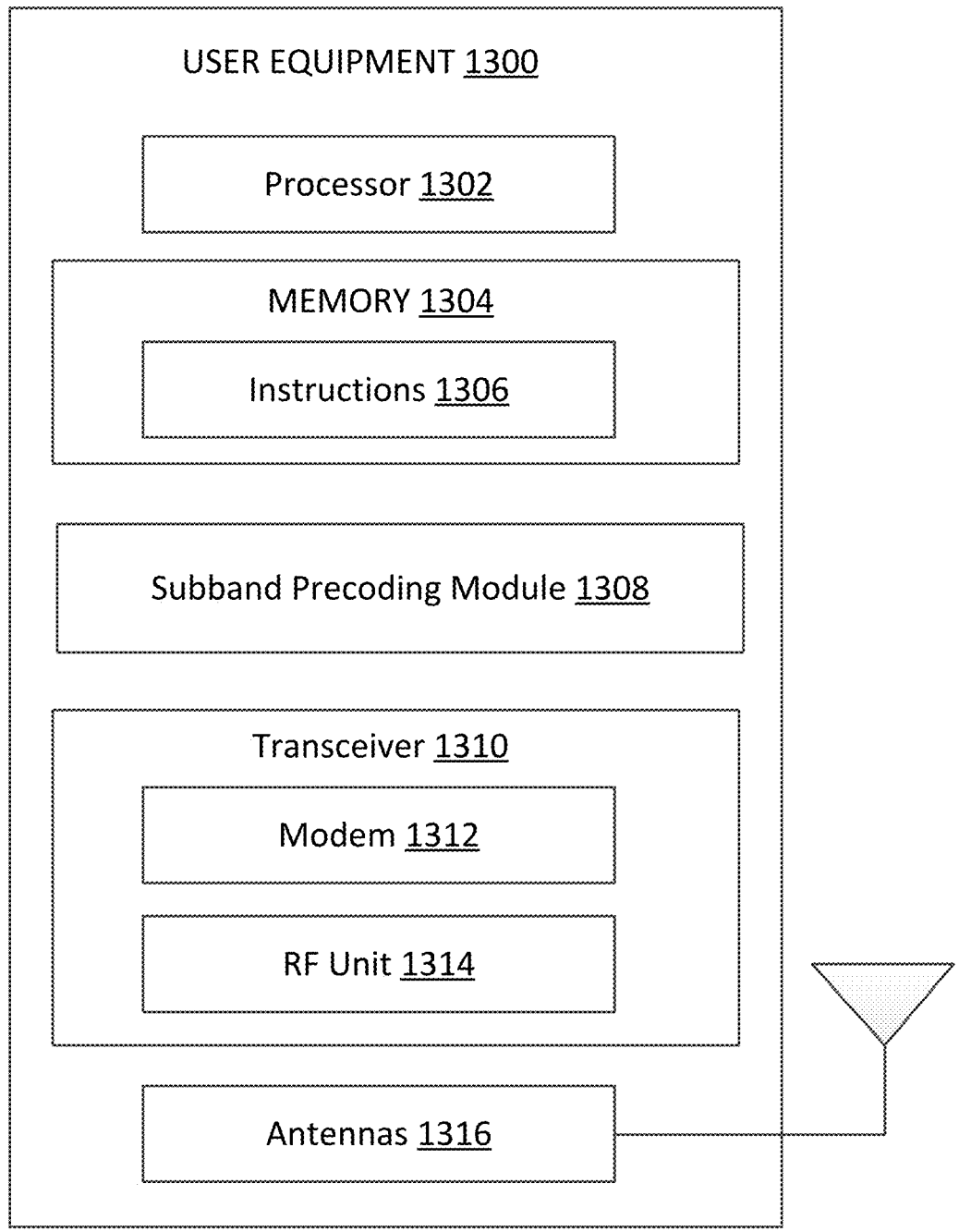
FIG. 13 is a block diagram of a UE according to some aspects of the present disclosure.

FIG. 13 is a block diagram of a UE 1300 according to some aspects of the present disclosure. The UE 1300 may be a UE 115 discussed above in FIG. 1 or a UE 315 discussed above in FIG. 3. As shown, the UE 1300 may include a processor 1302, a memory 1304, a subband precoding module 1308, a transceiver 1310 including a modem subsystem 1312 and a radio frequency (RF) unit 1314, and one or more antennas 1316. These elements may be in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1304 includes a non-transitory computer-readable medium. The memory 1304 may store, or have recorded thereon, instructions 1306. The instructions 1306 may include instructions that, when executed by the processor 1302, cause the processor 1302 to perform the operations described herein with reference to the UEs 115, 315 in connection with aspects of the present disclosure, for example, aspects of FIGS. 1-4 and 7-28, and Appendix A. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The subband precoding module 1308 may be implemented via hardware, software, or combinations thereof. The subband precoding module 1308 may be implemented as a processor, circuit, and/or instructions 1306 stored in the memory 1304 and executed by the processor 1302. In some instances, the subband precoding module 1308 can be integrated within the modem subsystem 1312. The subband precoding module 1308 can be implemented by a combination of software components (e.g., executed by a DSP or a general processor) and hardware components (e.g., logic gates and circuitry) within the modem subsystem 1312. The subband precoding module 1308 may be used for various aspects of the present disclosure, for example, aspects of FIGS. 1-4 and 7-28, and Appendix A.

In some aspects, the subband precoding module 1308 may be configured to receive from a BS, a subband precoding configuration indicating a plurality of precoders for a plurality of subbands based on a transmit power parameter, where each precoder of the plurality of precoders is configured for one subband of the plurality of subbands. In an example, the transmit power parameter is a constant PSD. The UE may determine, based on the subband precoding configuration, a set of antennas ports to use for transmitting a communication signal. The subband precoding module 1308 may be configured to transmit to the BS, a communication signal in the plurality of subbands using the plurality of precoders, where the transmitted communication signal satisfies the transmit power parameter. The subband precoding configuration may be in accordance with aspects of FIGS. 1-4 and 7-28, and Appendix A.

As shown, the transceiver 1310 may include the modem subsystem 1312 and the RF unit 1314. The transceiver 1310 can be configured to communicate bi-directionally with other devices, such as the BSs 105 or BS 1400. The modem subsystem 1312 may be configured to modulate and/or encode the data from the memory 1304 and/or the subband precoding module 1308 according to a modulation and coding scheme (MCS), e.g., a low-density parity check (LDPC) coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data from the modem subsystem 1312 (on outbound transmissions) or of transmissions originating from another source such as a UE 115, 315 or a BS 105, 1400. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 to enable the UE 115 to communicate with other devices. The RF unit 1314 may correspond to the RF transmit chains included within a transmit chain, as discussed in the present disclosure.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The transceiver 1310 may provide the demodulated and decoded data (e.g., indication of the maximum transmit power capability or the transmit precoding configuration) to the subband precoding module 1308 for processing. The antennas 1316 may include multiple antennas of similar or different designs in order to sustain multiple transmission links. The RF unit 1314 may configure the antennas 1316.

The antenna(s) 1316 may correspond to the antenna element(s) or port(s) discussed in the present disclosure.

In some aspects, by coordinating with the subband precoding module 1308, the transceiver 1310 is configured to receive a subband precoding configuration indicating a plurality of precoders for a plurality of subbands based on a transmit power parameter, where each precoder of the plurality of precoders is configured for one subband of the plurality of subbands. In some aspects, by coordinating with the subband precoding module 1308, the transceiver 1310 is configured to transmit a communication signal in the plurality of subbands using the plurality of precoders, where the transmitted communication signal satisfies the transmit power parameter.

In some aspects, the UE 1300 can include multiple transceivers 1310 implementing different radio access technologies (RATs) (e.g., NR and LTE). In an aspect, the UE 1300 can include a single transceiver 1310 implementing multiple RATs (e.g., NR and LTE). In an aspect, the transceiver 1310 can include various components, where different combinations of components can implement different RATs.

Figure 14:
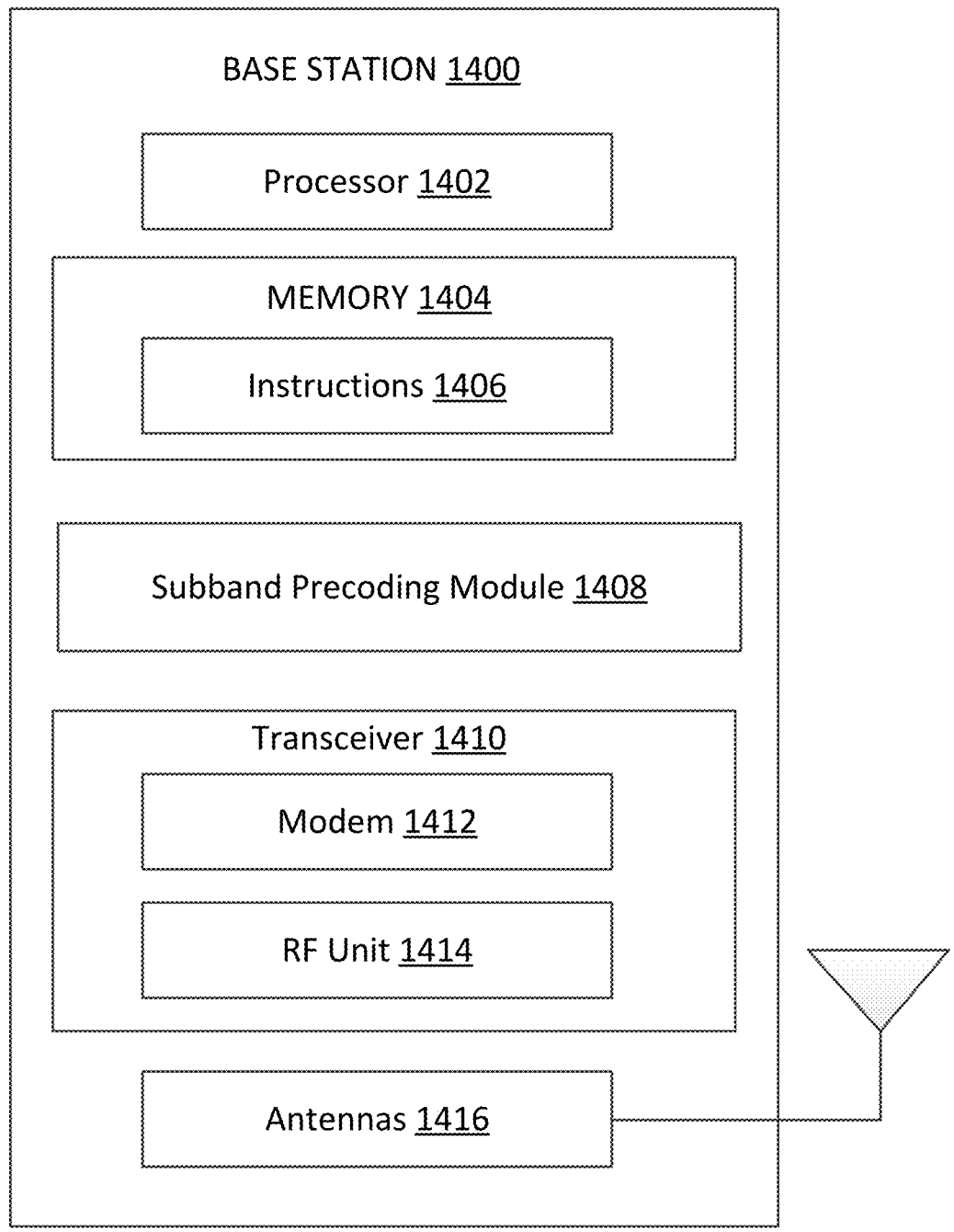
FIG. 14 is a block diagram of a base station (BS) according to some aspects of the present disclosure.

FIG. 14 is a block diagram of a BS 1400 according to some aspects of the present disclosure. The BS 1400 may be a BS 105 as discussed above in FIG. 1. As shown, the BS 1400 may include a processor 1402, a memory 1404, a subband precoding module 1408, a transceiver 1410 including a modem subsystem 1412 and a RF unit 1414, and one or more antennas 1416. These elements may be in direct or indirect communication with each other, for example via one or more buses.

The processor 1402 may have various features as a specific-type processor. For example, these may include a CPU, a DSP, an ASIC, a controller, a FPGA device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1404 may include a non-transitory computer-readable medium. The memory 1404 may store instructions 1406. The instructions 1406 may include instructions that, when executed by the processor 1402, cause the processor 1402 to perform operations described herein, for example, aspects of FIGS. 1, 2, 4 and 7-27, 29, and Appendix A. Instructions 1406 may also be referred to as code, which may be interpreted broadly to include any type of computer-readable statement(s) as discussed above with respect to FIG. 13.

The subband precoding module 1408 may be implemented via hardware, software, or combinations thereof. The subband precoding module 1408 may be implemented as a processor, circuit, and/or instructions 1406 stored in the memory 1404 and executed by the processor 1402. In some instances, the subband precoding module 1408 can be integrated within the modem subsystem 1412. The subband precoding module 1408 can be implemented by a combination of software components (e.g., executed by a DSP or a general processor) and hardware components (e.g., logic gates and circuitry) within the modem subsystem 1412. The subband precoding module 1408 may be used for various aspects of the present disclosure, for example, aspects of FIGS. 1, 2, 4 and 7-27, 29, and Appendix A.

In some aspects, the subband precoding module 1408 may be configured to transmit to a UE, a subband precoding configuration indicating a plurality of precoders for a plurality of subbands based on a transmit power parameter, where each precoder of the plurality of precoders is configured for one subband of the plurality of subbands. The subband precoding module 1408 may determine, based on one or more rules (e.g., discussed in relation to FIGS. 7-12), the subband precoding configuration such that the precoder combination included in the subband precoding configuration results in a constant PSD. The subband precoding module 1408 may be configured to receive from the UE, a communication signal in the plurality of subbands using the plurality of precoders, where the transmitted communication signal satisfies the transmit power parameter.

As shown, the transceiver 1410 may include the modem subsystem 1412 and the RF unit 1414. The transceiver 1410 can be configured to communicate bi-directionally with other devices, such as the UEs 115, 315 and/or 1300, a BS, and/or another core network element. The modem subsystem 1412 may be configured to modulate and/or encode data according to a MCS, e.g., a LDPC coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., grants, resource allocations) from the modem subsystem 1412 (on outbound transmissions) or of transmissions originating from another source such as a UE 115, 315 or 1300. The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together at the BS 105 to enable the BS 105 to communicate with other devices. The RF unit 1414 may correspond to the RF transmit chains included within a transmit chain, as discussed in the present disclosure.

The RF unit 1414 may provide the modulated and/or processed data, e.g. data packets (or, more generally, data messages that may contain one or more data packets and other information), to the antennas 1416 for transmission to one or more other devices. This may include, for example, transmission of information to complete attachment to a network and communication with a camped UE 115, 315, or 1300 according to some aspects of the present disclosure. The antennas 1416 may further receive data messages transmitted from other devices and provide the received data messages for processing and/or demodulation at the transceiver 1410. The transceiver 1410 may provide the demodulated and decoded data (e.g., precoders or subbands) to the subband precoding module 1408 for processing. The antennas 1416 may include multiple antennas of similar or different designs in order to sustain multiple transmission links.

In an example, by coordinating with the subband precoding module 1408, the transceiver 1410 is configured to transmit a subband precoding configuration indicating a plurality of precoders for a plurality of subbands based on a transmit power parameter, where each precoder of the plurality of precoders is configured for one subband of the plurality of subbands. In an example, by coordinating with the subband precoding module 1408, the transceiver 1410 is configured to receive a communication signal in the plurality of subbands, where the transmitted communication signal satisfies the transmit power parameter.

In some aspects, the BS 1400 can include multiple transceivers 1410 implementing different RATs (e.g., NR and LTE). In an aspect, the BS 1400 can include a single transceiver 1410 implementing multiple RATs (e.g., NR and LTE). In an aspect, the transceiver 1410 can include various components, where different combinations of components can implement different RATs.

The BS may transmit the subband precoding configuration in, for example, the DCI. The DCI may be an UL grant DCI. The DCI may indicate to the UE which precoder to apply for which subband. The UE may receive the DCI and determine, based on the DCI, which precoders to apply for which subbands.

In some examples, the BS fixes the size of the subbands indicated in the subband precoding configuration. The size of a subband is the number of RBs included in the subband. The BS may transmit a signal to the UE via RRC signaling, the signal indicating the fixed subband size. The BS may also indicate to the UE, usage of a particular precoder for each of the subbands.

Figure 15:
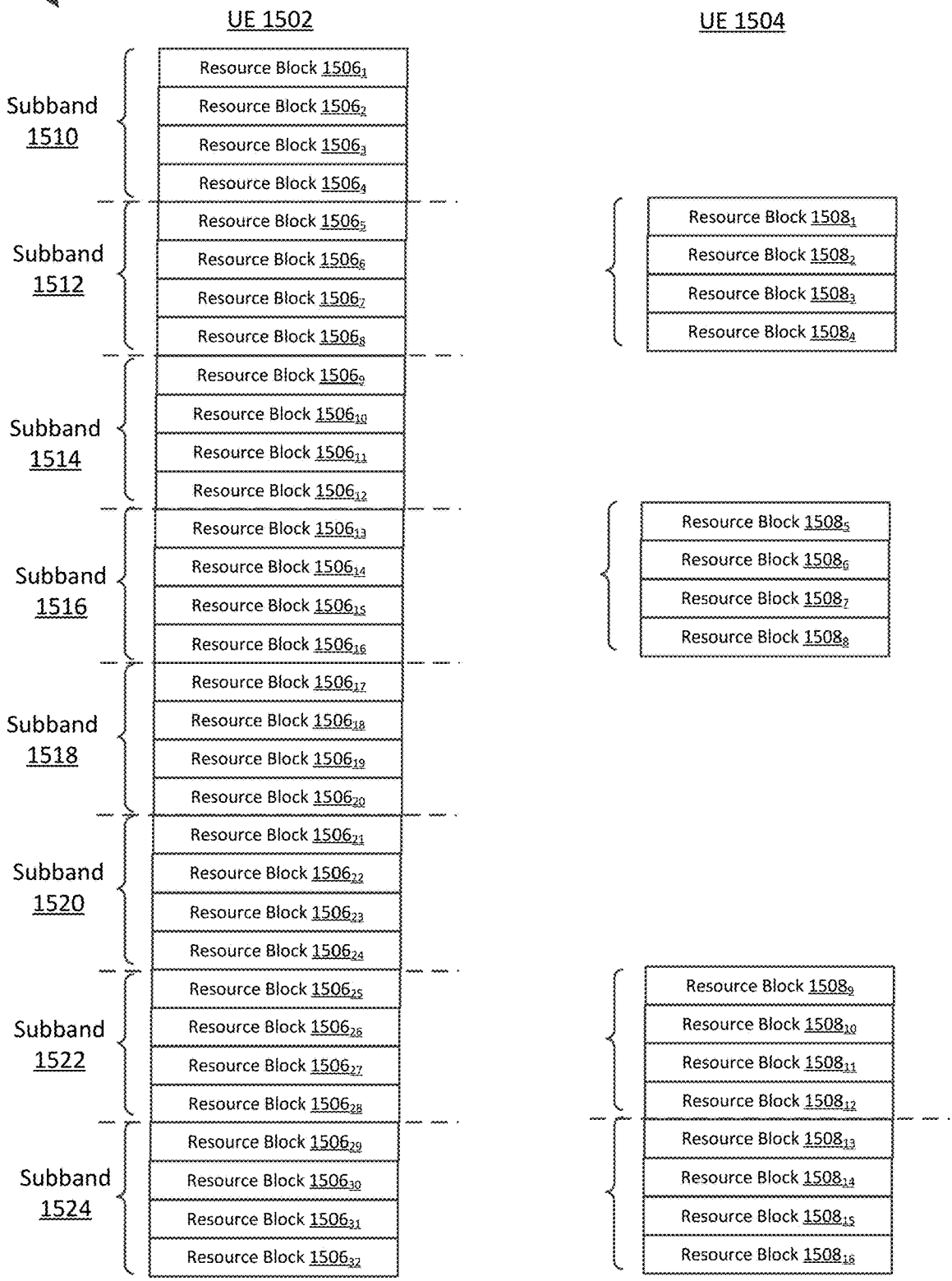
FIG. 15 illustrates a subband precoding configuration scheme having a fixed subband size according to some aspects of the present disclosure.

FIG. 15 illustrates a subband precoding configuration scheme 1500 having a fixed subband size according to some aspects of the present disclosure. The subband precoding scheme 1500 may be employed by BSs such as the BSs 105, 1400 and UEs such as the UEs 115, 315, 1300 in a network such as the network 100 for communications. In FIG. 15, the BS may assign or schedule transmission resources in the form of RBs 1506 to a UE 1502 and in the form of RBs 1508 to a UE 1504 in a plurality of subbands for UL transmissions in the network. The size of each of the subbands 1510, 1512, 1514, 1516, 1518, 1520, 1522, and 1524 is four.

For example, a BS may allocate in the same PUSCH transmission to the UE 1502, four RBs $1506_1$, $1506_2$, $1506_3$, and $1506_4$ in the subband 1510; four RBs $1506_5$, $1506_6$, $1506_7$, and $1506_8$ in the subband 1512; four RBs $1506_9$, $1506_{10}$, $1506_{11}$, and $1506_{12}$ in the subband 1514; four RBs $1506_{13}$, $1506_{14}$, $1506_{15}$, and $1506_{16}$ in the subband 1516; four RBs $1506_{17}$, $1506_{18}$, $1506_{19}$, and $1506_{29}$ in the subband 1518; four RBs $1506_{21}$, $1506_{22}$, $1506_{23}$, and $1506_{24}$ in the subband 1520; four RBs $1506_{25}$, $1506_{26}$, $1506_{27}$, and $1506_{28}$ in the subband 1522; four RBs $1506_{29}$, $1506_{30}$, $1506_{31}$, and $1506_{32}$ in the subband 1524. The RBs $1506_1$, $1506_2$, ..., and $1506_{32}$ assigned to the UE 1502 correspond to the same PUSCH transmission, and the eight subbands are assigned to the PUSCH transmission.

The BS may also allocate in the same PUSCH transmission to the UE 1504, four RBs $1508_1$, $1508_2$, $1508_3$, and $1508_4$ in the subband 1512; four RBs $1508_5$, $1508_6$, $1508_7$, and $1508_8$ in the subband 1516; four RBs $1508_9$, $1508_{10}$, $1508_{11}$, and $1508_{12}$ in the subband 1522; four RBs $1508_{13}$, $1508_{14}$, $1508_{15}$, and $1508_{16}$ in the subband 1524. The RBs $1508_1$, $1508_2$, ..., and $1508_{16}$ assigned to the UE 1504 correspond to the same PUSCH transmission, and the four subbands are assigned to the PUSCH transmission.

In subband precoding, the BS may signal one TPMI index or matrix per subband for the UE to apply in the respective subband. By fixing the subband size, the subband boundary between different UEs may be aligned, potentially decreasing intra-cell MU interference and intercell interference. The MU/interference constant may be set at a subband granularity. From the UE's perspective, the interference due to MU MIMO may be constant within a particular subband. Additionally, the interference may be different across different subbands. For example, in FIG. 15, from the UE 1502's perspective, there is no MU interference in subband 1510, and there is a constant MU interference in subband 1512. The constant MU interference in subband 1512 may be a result of an interfering UE (e.g., UE 1504). For example, the constant MU interference may be a result of the power of the interfering UE being constant in the subband 1512 and/or the subband 1512 being aligned between the UE 1502 and UE 1504. By fixing the subband size, however, the number of subbands assigned to a PUSCH transmission may vary. The number of RBs can change with different PUSCH assignments. For example, depending on a UE's data rate transmission or how much data the UE has requested to transmit, the BS may schedule 20 RBs in one slot and schedule 100 RBs in another slot for a PUSCH transmission. In FIG. 15, the BS schedules the UE 1502 for 32 RBs in a PUSCH transmission and schedules the UE 1504 for 16 RBs in a PUSCH transmission. With each subband size being four RBs, the UE 1502's PUSCH transmission spans 8 subbands and the UE 1504's PUSCH transmission spans 4 subbands.

If the BS signals the subband precoding configuration in the DCI, the number of bits in the DCI for signaling the subband precoding configuration may be dynamic or variable. In this example, the DCI size corresponding to each PUSCH transmission may depend on the number of subbands assigned for the PUSCH transmission. The DCI size may refer to the number of DCI bits. For example, if the BS uses five bits in the DCI for indicating a precoder for each subband, the number of bits for signaling the subband precoding configuration in the DCI depends on the number of subbands assigned for the PUSCH transmission. If the UE does not know the DCI size, the UE may attempt a large number of combinations of different DCI sizes to decode the DCI, potentially increasing the DCI decoding complexity for the UE.

Figure 16:
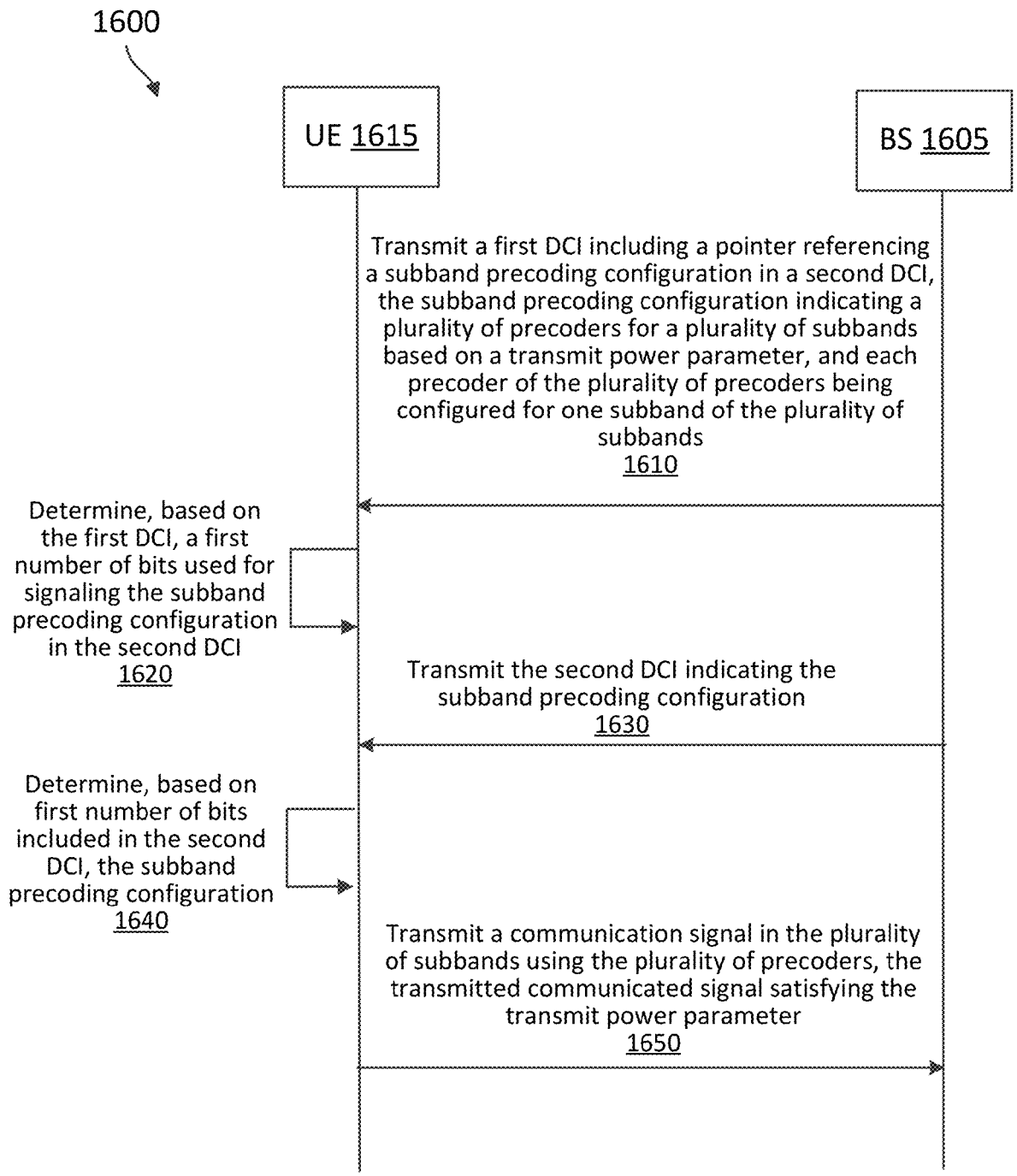
FIG. 16 is a signaling diagram of a subband precoding configuration communication method according to some aspects of the present disclosure.

In some examples, the BS may implement a two-stage DCI framework for signaling the subband precoding configuration to the UE. The two-stage DCI framework may overcome the DCI size ambiguity issue discussed above. FIG. 16 is a signaling diagram of a subband precoding configuration communication method 1600 according to some aspects of the present disclosure. The method 1600 may be implemented between a BS 1605 and a UE 1615 and may employ similar mechanisms as in the schemes 400 described with respect to FIG. 4, similar mechanisms as in the methods 2800 and/or 2900, described with respect to FIGS. 28 and 29, respectively, and similar mechanisms as in Appendix A. The BS 1605 may be similar to the BS 105, 1400 and the UE 1615 may be similar to the UE 115, 315, 1300. Additionally, the BS 1605 and the UE 1615 may operate in a network such as the network 100. As illustrated, the method 1600 includes a number of enumerated steps, but embodiments of the method 1600 may include additional steps before, after, and in between the enumerated steps. In some aspects, one or more of the enumerated steps may be omitted or performed in a different order.

At step 1610, the BS 1605 transmits a first DCI including a pointer referencing a subband precoding configuration in a second DCI, the subband precoding configuration indicating a plurality of precoders for a plurality of subbands based on a transmit power parameter, and each precoder of the plurality of precoders being configured for one subband of the plurality of subbands. In some examples, the first DCI includes the starting RB index for the UE to receive the second DCI and further includes the size of the second DCI (e.g., the number of bits included in the second DCI). The first DCI may also include the number of RBs included in the PUSCH assignment. The first DCI indicates a first number of bits included in the second DCI. The pointer references or points to the location of the RBs that carry the second DCI. The pointer and the second DCI size may be represented by a second number of bits included in the first DCI, and the second number of bits may be fixed such that the UE 1615 is aware of how many bits in the first DCI are used for indicating the size of the subband precoding configuration. In an example, the second number of bits is five. In other examples, the second number of bits may be greater or less than five. The UE 1615 receives the first DCI transmitted by the BS in step 1610.

At step 1620, the UE 1615 determines, based on the first DCI, a first number of bits used for signaling the subband precoding configuration in the second DCI. The UE 1615 may be aware of the second number of bits in the first DCI being used for signaling a size of the subband precoding configuration.

At step 1630, the BS 1605 transmits the second DCI indicating the subband precoding configuration to the UE 1615. The UE 1615 receives the second DCI transmitted by the BS in step 1630.

At step 1640, the UE 1615 determines, based on the first number of bits included in the second DCI, the subband precoding configuration. In an example, the UE 1615 determines the first number of bits based on the second DCI size included in the first DCI.

At step 1650, the UE 1615 transmits a communication signal in the plurality of subbands using the plurality of precoders to the BS 1605, the transmitted communication signal satisfying the transmit power parameter. For instance, the UE 1615 may apply a corresponding precoder to each subband.

In some examples, the BS may signal precoding information and a number of transmission layers in the DCI to the UE. The signaling may conform to a DCI format (e.g., DCI format 0_1), for X subbands in PUSCH. In an example, the BS may signal a number of layers for the PUSCH transmission and may further signal the precoder for the first subband out of the X subbands. The DCI may include a "subband PMIs" field, the number of bits in the "subband PMIs" field depending on, for example, a number of antenna ports at the UE, a codebook subset, a number of layers of the PUSCH transmission, a maximum number of layers, and the type of precoders used for subband precoding (e.g., non-coherent, partially coherent, or fully coherent precoders) for the PUSCH transmission. For the remaining (X−1) subbands, the BS may indicate the number of bits for the "subband PMIs" field, where X is the number of subbands for the PUSCH. The subband PMIs may refer to TPMI, and the contents of the "subband PMIs" signaling is included in the second DCI.

The BS and the UE may communicate via a variable-size DCI to signal a subband precoding configuration. The number of subbands for a PUSCH may be in accordance with Equation (1) below:

$$X = \text{ceiling}((\text{number of RBs of the PUSCH})/(P)) \quad \text{Equation (1)},$$

where X is the number of subbands for the PUSCH, and P is the fixed subband size.

The BS and/or the UE may determine, based on the transmit power parameter (e.g., constant PSD), the number of bits used in the "subband PMIs" field and signaling details in accordance with FIGS. 17-24.

FIG. 17 is a table 1700 storing information used for signaling a subband precoding configuration for a maximum two-layer, three-layer, or four-layer transmission for a UE having two antenna ports, if the transform precoder is disabled, according to some aspects of the present disclosure. If the transform precoding is disabled, the transmitted waveform corresponds to CP-OFDM. The table 1700 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A.

The table 1700 includes a first set of entries 1701 for a codebook subset including fully coherent, partially coherent, and non-coherent precoders. Codebook subsets including fully coherent, partially coherent, and non-coherent precoders in relation to the first set of entries 1701 are shown in FIGS. 9-12. In a row 1702 in the first set of entries 1701, a single-layer transmission may use partially coherent precoders. As discussed in relation to FIG. 9, for a single-layer PUSCH transmission for a UE having four antenna ports, one or more rules for UL subband precoding may be specified. A first rule may specify that partially coherent precoders and fully coherent precoders cannot be simultaneously used for subband precoding for the same PUSCH transmission. A second rule may specify that precoders from the first set of partially coherent precoders 904 and the second set of partially coherent precoders 906 cannot be simultaneously used for subband precoding for the same PUSCH transmission. Based on the first and second rules, if partially coherent precoders are used for subband precoding, then any one of the four partially coherent precoders from either one of the first set of partially coherent precoders 904 or the second set of partially coherent precoders 906 may be indicated in a subband precoding configuration. Accordingly, two bits per subband may be used for signaling one out of four partially coherent precoders. As indicated in the row 1702 in the first set of entries 1701, a total number of "2(X−1)" bits are used for the "subband PMIs" field for a single-layer PUSCH transmission using partially coherent precoders.

In a row 1704 in the first set of entries 1701, a single-layer transmission may use fully coherent precoders. Based on the first and second rules, if fully coherent precoders are used for subband precoding, then any one of the sixteen fully coherent precoders from the set of fully coherent precoders 908 in FIG. 9 may be indicated in a subband precoding configuration. Accordingly, four bits per subband may be used for signaling one out of sixteen fully coherent precoders. As indicated in the row 1704 in the first set of entries 1701, a total number of "4(X−1)" bits are used for the "subband PMIs" field for a single-layer PUSCH transmission using fully coherent precoders.

In a row 1706 in the first set of entries 1701, a two-layer transmission may use partially coherent and fully coherent precoders. As discussed above in relation to FIG. 10, for a two-layer PUSCH transmission for a UE having four antenna ports, a rule for UL subband precoding may specify that both partially coherent and fully coherent precoders may be used simultaneously for subband precoding of the same PUSCH transmission. Based on this rule, any of the eight partially coherent precoders of the set of partially coherent precoders 1006 and/or any of the eight fully coherent precoders of the set of fully coherent precoders 1008 may be indicated in a subband precoding configuration. Accordingly, four bits per subband may be used for signaling one out of sixteen partially and fully coherent precoders. As indicated in the row 1706 in the first set of entries 1701, a total number of "4(X−1)" bits are used for the "subband PMIs" field for a two-layer PUSCH transmission using partially and fully coherent precoders.

In a row 1708 in the first set of entries 1701, a three-layer transmission may use partially coherent and fully coherent precoders. As discussed above in relation to FIG. 11, for a three-layer PUSCH transmission for a UE having four antenna ports, a rule for UL subband precoding may specify that both partially coherent and fully coherent precoders may be used simultaneously for subband precoding of the same PUSCH transmission. Based on this rule, any of the two partially coherent precoders of the set of partially coherent precoders 1104 and/or any of the four fully coherent precoders of the set of fully coherent precoders 1008 may be indicated in a subband precoding configuration. Accordingly, three bits per subband may be used for signaling one out of the six partially and fully coherent precoders (e.g., sum of the two partially coherent precoders and the four fully coherent precoders). As indicated in the row 1708 in the first set of entries 1701, a total number of "3(X−1)" bits are used for the "subband PMIs" field for a three-layer PUSCH transmission using partially and fully coherent precoders.

In a row 1710 in the first set of entries 1701, a four-layer transmission may use non-coherent, partially coherent, and fully coherent precoders. As discussed above in relation to FIG. 12, for a four-layer PUSCH transmission for a UE having four antenna ports, any of the one non-coherent precoders of the set of non-coherent precoders 1202, the two partially coherent precoders of the set of partially coherent precoders 1204, and the two fully coherent precoders of the set of fully coherent precoders 1206 may be used simultaneously for subband precoding of the same PUSCH transmission. Accordingly, three bits per subband may be used for signaling one out of the five non-coherent, partially coherent, and/or fully coherent precoders (e.g., sum of the one non-coherent precoder, two partially coherent precoders, and two fully coherent precoders). As shown in the row 1710 in the first set of entries 1701, a total number of "3(X−1)" bits are used for the "subband PMIs" field for a four-layer PUSCH transmission using partially and fully coherent precoders.

The table 1700 includes a second set of entries 1712 for a codebook subset including partially coherent and non-coherent precoders. Codebook subsets including partially coherent and non-coherent precoders in relation to the second set of entries 1712 are shown in FIGS. 9-12. In the row 1702 in the second set of entries 1712, a single-layer transmission may use partially coherent precoders. As discussed in relation to FIG. 9, for a single-layer PUSCH transmission for a UE having four antenna ports, one or more rules for UL subband precoding may be specified. Based on the first and second rules (discussed in relation to the row 1702 in the first set of entries 1712), if partially coherent precoders are used for subband precoding, then any one of the four partially coherent precoders from either one of the first set of partially coherent precoders 904 or the second set of partially coherent precoders 906 may be indicated in a subband precoding configuration. Accordingly, two bits per subband may be used for signaling one out of four partially coherent precoders. As indicated in the row 1702 in the second set of entries 1712, a total number of "2(X−1)" bits are used for the "subband PMIs" field for a single-layer PUSCH transmission using partially coherent precoders.

In the row 1704 in the second set of entries 1712, a two-layer transmission may use partially coherent precoders. As discussed above in relation to FIG. 10, for a two-layer PUSCH transmission for a UE having four antenna ports, a rule for UL subband precoding may specify that both partially coherent and fully coherent precoders may be used simultaneously for subband precoding of the same PUSCH transmission. Based on this rule, any of the eight partially coherent precoders of the set of partially coherent precoders 1006 may be indicated in a subband precoding configuration. Accordingly, three bits per subband may be used for signaling one out of the eight partially coherent precoders. As indicated in the row 1704 in the second set of entries 1712, a total number of "3(X−1)" bits are used for the "subband PMIs" field for a two-layer PUSCH transmission using partially coherent precoders.

In the row 1706 in the second set of entries 1712, a three-layer transmission may use partially coherent precoders. As discussed above in relation to FIG. 11, for a three-layer PUSCH transmission for a UE having four antenna ports, a rule for UL subband precoding may specify that both partially coherent and fully coherent precoders may be used simultaneously for subband precoding of the same PUSCH transmission. Based on this rule, any of the two partially coherent precoders of the set of partially coherent precoders 1104 may be indicated in a subband precoding configuration. Accordingly, one bit per subband may be used for signaling one out of the two partially coherent precoders. As indicated in the row 1706 in the second set of entries 1712, a total number of "1(X−1)" bits are used for the "subband PMIs" field for a three-layer PUSCH transmission using partially coherent precoders.

In a row 1708 in the second set of entries 1712, a four-layer transmission may use non-coherent, partially coherent, and fully coherent precoders. As discussed above in relation to FIG. 12, for a four-layer PUSCH transmission for a UE having four antenna ports, any of the one non-coherent precoders of the set of non-coherent precoders 1202, the two partially coherent precoders of the set of partially coherent precoders 1204, and the two fully coherent precoders of the set of fully coherent precoders 1206 may be used simultaneously used for subband precoding of the same PUSCH transmission. Accordingly, two bits per subband may be used for signaling one out of the three non-coherent and partially coherent precoders (e.g., sum of the one non-coherent precoder and two partially coherent precoders). As shown in the row 1708 in the second set of entries 1712, a total number of "2(X−1)" bits are used for the "subband PMIs" field for a four-layer PUSCH transmission using non-coherent and partially coherent precoders.

FIG. 18 is a table 1800 storing subband precoding signaling information for four antenna ports and a maximum two-layer, three-layer, or four-layer transmission, if the transform precoder is disabled, according to some aspects of the present disclosure. The table 1800 provides precoding information, the number of layers, and subband PMIs signaling details in relation to the table 1700.

The table 1800 includes an entry 1802 with four columns. A first column "Bit field mapped to index" stores the value "12." A second column "interpretation" stores "1 layer: TPMI=4," indicating that the UE may transmit a single layer for the PUSCH transmission and may apply a TPMI=4 for the first subband of the transmission. A third column "# bits for subband PMIs" stores "+2(X−1)," indicating that the UE may need another 2(X−1) bits in the DCI to determine the precoder used for the remaining (X−1) subbands, where each subband uses 2 bits to determine the corresponding TPMI. A fourth column "Subband PMI signal table" stores "4TX-L1PA," indicating that for each subband, the UE may determine how each of the 2 bits maps to a particular TPMI based on table labeled as 4Tx-L1PA for the TPMI information.

FIG. 19 is a table 1900 storing information used for signaling a subband precoding configuration for a maximum single-layer transmission for a UE having four antenna ports, if the transform precoder is disabled, according to some aspects of the present disclosure. If the transform precoding is disabled, the transmitted waveform corresponds to CP-OFDM. The table 1900 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A.

The table 1900 includes a first set of entries 1901 for a codebook subset including fully coherent, partially coherent, and non-coherent precoders. A codebook subset including fully coherent, partially coherent, and non-coherent precoders in relation to the table 1900 is shown in FIG. 9. In a row 1902 in the first set of entries 1901, a single-layer transmission may use partially coherent precoders. As discussed in relation to FIG. 9, for a single-layer PUSCH transmission for a UE having four antenna ports, one or more rules for UL subband precoding may be specified. Based on the first and second rules (discussed in relation to the row 1702 in the first set of entries 1712), if partially coherent precoders are used for subband precoding, then any one of the four partially coherent precoders from either one of the first set of partially coherent precoders 904 or the second set of partially coherent precoders 906 may be indicated in a subband precoding configuration. Accordingly, two bits per subband may be used for signaling one out of four partially coherent precoders. As indicated in the row 1902 in the first set of entries 1901, a total number of "2(X−1)" bits are used for the "subband PMIs" field for a single-layer PUSCH transmission using partially coherent precoders.

In a row 1904 in the first set of entries 1901, a single-layer transmission may use fully coherent precoders. Based on the first and second rules, if fully coherent precoders are used for subband precoding, then any one of the sixteen fully coherent precoders from the set of fully coherent precoders 908 in FIG. 9 may be indicated in a subband precoding configuration. Accordingly, four bits per subband may be used for signaling one out of sixteen fully coherent precoders. As indicated in the row 1904 in the first set of entries 1901, a total number of "4(X−1)" bits are used for the "subband PMIs" field for a single-layer PUSCH transmission using fully coherent precoders.

The table 1900 includes a second set of entries 1912 for a codebook subset including partially coherent and non-coherent precoders. Codebook subsets including partially coherent and non-coherent precoders in relation to the second set of entries 1912 is shown in FIG. 9. In the row 1902 in the second set of entries 1912, a single-layer transmission may use partially coherent precoders. As discussed in relation to FIG. 9, for a single-layer PUSCH transmission for a UE having four antenna ports, one or more rules for UL subband precoding may be specified. Based on the first and second rules (discussed in relation to the row 1702 in the first set of entries 1712), if partially coherent precoders are used for subband precoding, then any one of the four partially coherent precoders from either one of the first set of partially coherent precoders 904 or the second set of partially coherent precoders 906 may be indicated in a subband precoding configuration. Accordingly, two bits per subband may be used for signaling one out of four partially coherent precoders. As indicated in the row 1902 in the second set of entries 1912, a total number of "2(X−1)" bits are used for the "subband PMIs" field for a single-layer PUSCH transmission using partially coherent precoders.

FIG. 20 is a table 2000 storing subband precoding signaling information for four antenna ports and a maximum single-layer transmission, if the transform precoder is disabled, according to some aspects of the present disclosure. The table 2000 provides precoding information, the number of layers, and subband PMIs signaling details in relation to the table 1800.

FIG. 21 is a table 2100 storing information used for signaling a subband precoding configuration for a maximum two-layer transmission for a UE having two antenna ports, if the transform precoder is disabled, according to some aspects of the present disclosure. If the transform precoding is disabled, the transmitted waveform corresponds to CP-OFDM. The table 2100 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A.

The table 2100 includes a first set of entries 2101 for a codebook subset including fully coherent, partially coherent, and non-coherent precoders. A codebook subset including fully coherent, partially coherent, and non-coherent precoders in relation to the table 2100 is shown in FIG. 7. In a row 2102 in the first set of entries 2101, a single-layer transmission may use fully coherent precoders. As discussed in relation to FIG. 7, for a single-layer PUSCH transmission for a UE having two antenna ports, any one of the four fully coherent precoders of the set of fully coherent precoders 704 may be included in the plurality of precoders indicated in the subband precoding configuration. Accordingly, two bits per subband may be used for signaling one out of four fully coherent precoders. As indicated in the row 2102 in the first set of entries 2101, a total number of "2(X−1)" bits are used for the "subband PMIs" field for a single-layer PUSCH transmission using fully coherent precoders.

In a row 2104 in the first set of entries 2101, a two-layer transmission may use fully coherent and non-coherent precoders. A codebook subset including fully coherent, partially coherent, and non-coherent precoders in relation to the table 2100 is shown in FIG. 8. In the row 2104 in the first set of entries 2101, a two-layer transmission may use fully coherent and non-coherent precoders. As discussed in relation to FIG. 8, a rule may specify that the non-coherent precoder of the set of non-coherent precoders 802 and/or one or more fully coherent precoders of the set of fully coherent precoders 804 may be included in the plurality of precoders indicated in the subband precoding configuration. Accordingly, two bits per subband may be used for signaling one out of three non-coherent and fully coherent precoders. As indicated in the row 2104 in the first set of entries 2101, a total number of "2(X−1)" bits are used for the "subband PMIs" field for a two-layer PUSCH transmission using fully coherent and non-coherent precoders.

FIG. 22 is a table 2200 storing subband precoding signaling information for two antenna ports and a maximum two-layer transmission, if the transform precoder is disabled, according to some aspects of the present disclosure. The table 2200 provides precoding information, the number of layers, and subband PMIs signaling details in relation to the table 2100.

FIG. 23 is a table 2300 storing information used for signaling a subband precoding configuration for a maximum single-layer transmission for a UE having two antenna ports, if the transform precoder is disabled, according to some aspects of the present disclosure. If the transform precoding is disabled, the transmitted waveform corresponds to CP-OFDM. The table 2300 may be used by a BS and/or a UE to employ similar mechanisms as in the schemes 400 and/or 1500, described with respect to FIGS. 4 and 15, similar mechanisms as in the communication method 1600 in FIG. 7, similar mechanisms as in the methods 2800 and/or 2900, described with respect to FIGS. 28 and 29, respectively, and similar mechanisms as in Appendix A.

The table 2300 includes a set of entries for a codebook subset including fully coherent, partially coherent, and non-coherent precoders. A codebook subset including fully coherent, partially coherent, and non-coherent precoders in relation to the table 2300 is shown in FIG. 7. In a row 2302, a single-layer transmission may use fully coherent precoders. As discussed in relation to FIG. 7, for a single-layer PUSCH transmission for a UE having two antenna ports, any one of the four fully coherent precoders of the set of fully coherent precoders 704 may be included in the plurality of precoders indicated in the subband precoding configuration. Accordingly, two bits per subband may be used for signaling one out of four fully coherent precoders. As indicated in the row 2302, a total number of "2(X−1)" bits are used for the "subband PMIs" field for a single-layer PUSCH transmission using fully coherent precoders.

FIG. 24 is a table 2400 storing subband precoding signaling information for two antenna ports and a maximum single-layer transmission, if the transform precoder is disabled, according to some aspects of the present disclosure. The table 2400 provides precoding information, the number of layers, and subband PMIs signaling details in relation to the table 2300.

In some examples, the BS fixes the number of subbands indicated in the subband precoding configuration. The BS may transmit a signal to the UE via RRC signaling, the signal indicating the fixed number of subbands. The BS may also indicate to the UE, usage of a particular precoder for each of the subbands.

Figure 25:
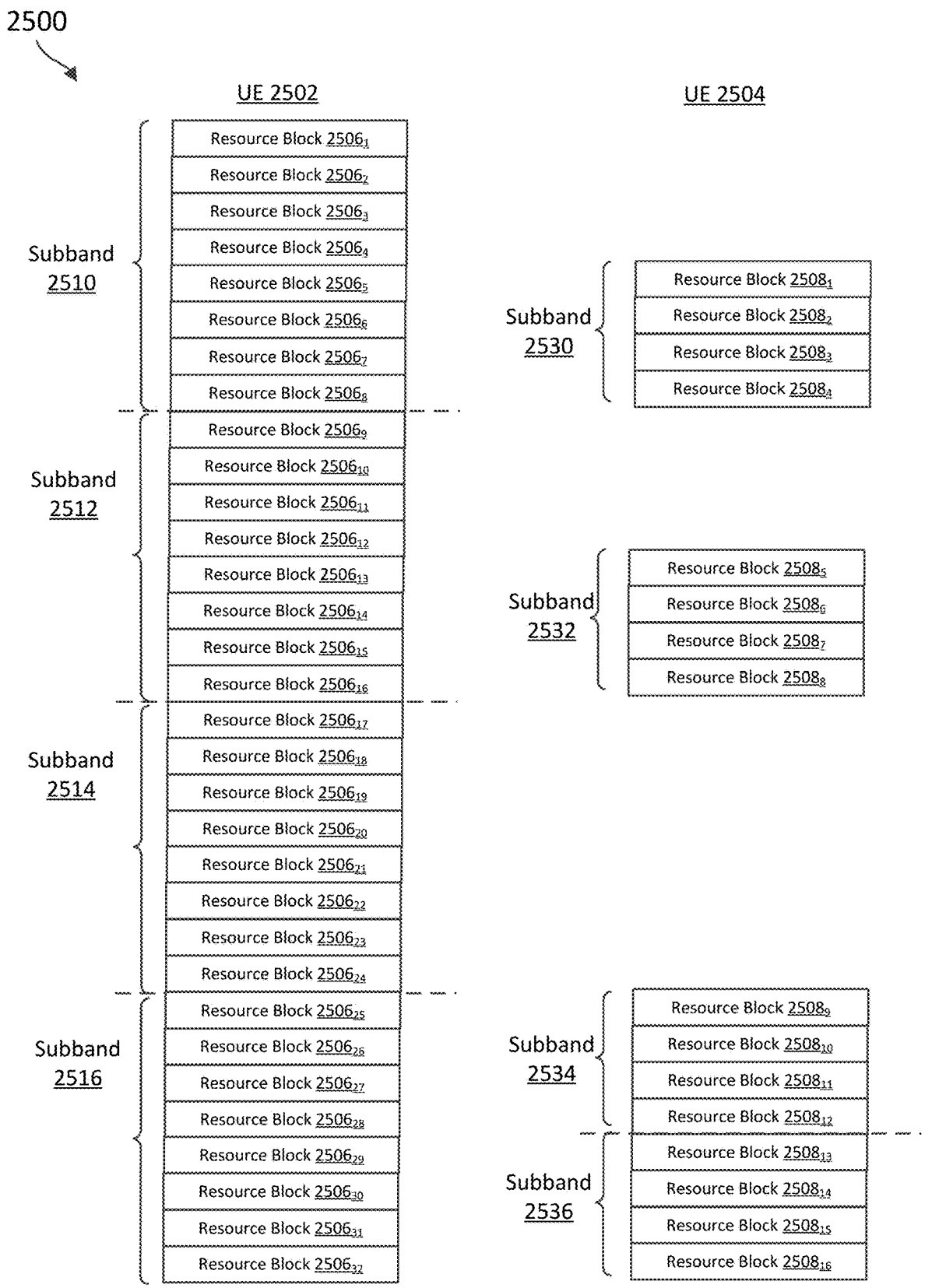
FIG. 25 illustrates a subband precoding configuration scheme having a fixed number of subbands according to some aspects of the present disclosure.

FIG. 25 illustrates a subband precoding configuration scheme 2500 having a fixed number of subbands according to some aspects of the present disclosure. The subband precoding scheme 2500 may be employed by BSs such as the BSs 105, 1400 and UEs such as the UEs 115, 315, 1300 in a network such as the network 100 for communications. In FIG. 25, the BS may assign or schedule transmission resources in the form of RBs 2506 to a UE 2502 and in the form of RBs 2508 to a UE 2504 in a plurality of subbands for UL transmissions in the network. The subband precoding configuration indicates a precoder for each of four subbands 2510, 2512, 2514, and 2516.

For example, a BS may allocate in the same PUSCH transmission to the UE 2502, eight RBs $2506_1$, $2506_2, \ldots, 2506_8$ in the subband 2510; eight RBs $2506_9$, $2506_{10}, \ldots,$ and $2506_{16}$ in the subband 2512; eight RBs $2506_{17}$, $2506_{18}$, ..., $2506_{24}$ in the subband 2514; and eight RBs $2506_{25}$, $2506_{26}$, ..., $2506_{32}$ in the subband 2516. The RBs $2506_1$, $2506_2$, ..., and $2506_{32}$ assigned to the UE 2502 correspond to the same PUSCH transmission, and the four subbands are assigned to the PUSCH transmission.

The BS may also allocate in the same PUSCH transmission to the UE 2504, four RBs $2508_1$, $2508_2$, $2508_3$, and $2508_4$ in the subband 2530; four RBs $2508_5$, $2508_6$, $2508_7$, and $2508_8$ in the subband 2532; four RBs $2508_9$, $2508_{10}$, $2508_{11}$, and $2508_{12}$ in the subband 2534; and four RBs $2508_{13}$, $2508_{14}$, $2508_{15}$, and $2508_{16}$ in the subband 2536. The RBs $2508_1$, $2508_2$, ..., and $2508_{16}$ assigned to the UE 2504 correspond to the same PUSCH transmission, and the four subbands are assigned to the PUSCH transmission.

In subband precoding, the BS may signal one TPMI index or matrix per subband for the UE to apply in the respective subband. Although the number of subbands is constant in the subband precoding configuration scheme 2500, the subband size per PUSCH allocation may vary. The number of RBs within a subband can change with different PUSCH assignments. In FIG. 25, the BS schedules the UE 2502 for 32 RBs in across four subbands in a PUSCH transmission and schedules the UE 2504 for 16 RBs across four subbands in a PUSCH transmission.

If the BS signals the subband precoding configuration in the DCI, the number of bits in the DCI for signaling the subband precoding configuration may be a constant. By fixing the number of subbands included in a subband precoding configuration, however, the subband boundary between different UEs may be misaligned, potentially increasing intra-cell MU interference and intercell interference. An advantage of fixing the number of subbands may provide for a fixed DCI size to signal the subband precoding configuration. In some examples, M is configured semi-statically via RRC signaling per UE. In response to receiving the RRC configuration, the UE may determine the exact DCI size that is used to schedule PUSCH with subband precoding enabled.

Referring back to FIG. 17, in the row 1706 in the first set of entries 1701, a total number of "4(X−1)" bits are used for the "subband PMIs" field for a UE having four antenna ports and two-layer PUSCH transmission using partially and fully coherent precoders. In the row 1708 in the first set of entries 1701, a total number of "3(X−1)" bits are used for the "subband PMIs" field for a three-layer PUSCH transmission using partially and fully coherent precoders. Accordingly, an ambiguity exists between using "4(X−1)" bits versus using "3(X−1)" bits in the DCI. The ambiguity of using "4(X−1)" bits versus using "3(X−1)" bits in the DCI (e.g., in the "subband PMIs" field) may be removed by using aspects of FIGS. 26 and 27, which assume the worst-case scenario for the number of bits. With the ambiguity removed, BS and/or the UE may determine, based on the transmit power parameter (e.g., constant PSD), the number of bits used in the "subband PMIs" field and signaling details in accordance with FIGS. 26 and 27.

FIG. 26 is a table 2600 storing information used for signaling a subband precoding configuration for a maximum two-layer, three-layer, or four-layer transmission for a UE having two antenna ports, if the transform precoder is disabled, according to some aspects of the present disclosure. If the transform precoding is disabled, the transmitted waveform corresponds to CP-OFDM. The table 2600 may be used by a BS and/or a UE to employ similar mechanisms as in the schemes 400 and/or 1500, described with respect to FIGS. 4 and 15, similar mechanisms as in the methods 2800 and/or 2900, described with respect to FIGS. 28 and 29, respectively, and similar mechanisms as in Appendix A.

The BS and/or the UE may determine a "number of bits in the subband PMIs" for signaling the subband precoding configuration based on the number of antenna ports, the number of layers, and/or the codebook subset (e.g., type of precoders). The BS and/or the UE may compare the one or more numbers of bits and determine that the greatest number of bits in the comparison is the DCI bit size. The BS may insert dummy bits into the DCI to match with the worst-case scenario (greatest number of bits) such that the total number of bits in the DCI is a constant.

The table 2600 includes a first set of entries 2601 for a codebook subset including fully coherent, partially coherent, and non-coherent precoders. The first set of entries 2601 in the table 2600 may be compared to the first set of entries 1701 in the table 1700. In the first set of entries 1701, the UE may compare the "2(X−1)" bits in the row 1702, the "4(X−1)" bits in the row 1704, the "4(X−1)" bits in the row 1706, the "3(X−1)" bits in the row 1708, and the "3(X−1)" bits in the row 1710, and identify the greatest number of bits based on the comparison. The values in the "number of bits in subband PMIs" in the first set of entries 2601 are equal to the greatest number of bits in the first set of entries 1701, which is "4(X−1)" bits. A box 2602, a box 2604, and a box 2606 shows the updated "number of bits in subband PMIs" ("4(X−1)" bits) for signaling the subband precoding configuration in the respective boxes.

The table 2600 includes a second set of entries 2612 for a codebook subset including partially coherent and non-coherent precoders. The second set of entries 2612 in the table 2600 may be compared to the second set of entries 1712 in the table 1700. In second set of entries 2612, the UE may compare the "2(X−1)" bits in the row 1702, the "3(X−1)" bits in the row 1704, the "1(X−1)" bits in the row 1706, and the "2(X−1)" bits in the row 1708, and identify the greatest number of bits based on the comparison. The values in the "number of bits in subband PMIs" in the first set of entries 2612 are equal to the greatest number of bits in the second set of entries 1712, which is "3(X−1)" bits. A box 2608, a box 2610, and a box 2611 shows the updated "number of bits in subband PMIs" ("3(X−1)" bits) for signaling the subband precoding configuration in the respective boxes.

Additionally, the table 1800 in FIG. 18 provides precoding information, the number of layers, and subband PMIs signaling details in relation to the table 2600.

FIG. 27 is a table 2700 storing information used for signaling a subband precoding configuration for a maximum single-layer transmission for a UE having four antenna ports, if the transform precoder is disabled, according to some aspects of the present disclosure. If the transform precoding is disabled, the transmitted waveform corresponds to CP-OFDM. The table 2700 may be used by a BS and/or a UE to employ similar mechanisms as in the schemes 400 and/or 1500, described with respect to FIGS. 4 and 15, similar mechanisms as in the methods 2800 and/or 2900, described with respect to FIGS. 28 and 29, respectively, and similar mechanisms as in Appendix A.

The table 2700 includes a first set of entries 2701 for a codebook subset including fully coherent, partially coherent, and non-coherent precoders. The first set of entries 2701 in the table 2700 may be compared to the first set of entries 1901 in the table 1900. In the first set of entries 1901, the UE may compare the "2(X−1)" bits in the row 1902 and the "4(X−1)" bits in the row 1904, and identify the greatest number of bits based on the comparison. The values in the "number of bits in subband PMIs" in the first set of entries 2901 are equal to the greatest number of bits in the first set of entries 1901, which is "4(X−1)" bits. A box 2702 shows the updated "number of bits in subband PMIs" ("4(X−1)" bits) for signaling the subband precoding configuration in the respective box.

Additionally, the table 2000 in FIG. 20 provides precoding information, the number of layers, and subband PMIs signaling details in relation to the table 2700.

No ambiguity in the number of bits in the subband PMI is present in the table 2100 for two antenna ports and for a maximum of two-layer transmission, if the transform precoder is disabled. Accordingly, the BS may use the values in the table 2100 for determining the DCI size when signaling the subband precoding configuration to the UE. The table 2200 provides precoding information, the number of layers, and subband PMIs signaling details in relation to the table 2100.

No ambiguity in the number of bits in the subband PMI is present in the table 2300 for two antenna ports and for a maximum of a single-layer transmission, if the transform precoder is disabled. Accordingly, the BS may use the values in the table 2300 for determining the DCI size when signaling the subband precoding configuration to the UE. The table 2400 provides precoding information, the number of layers, and subband PMIs signaling details in relation to the table 2300.

Figure 28:
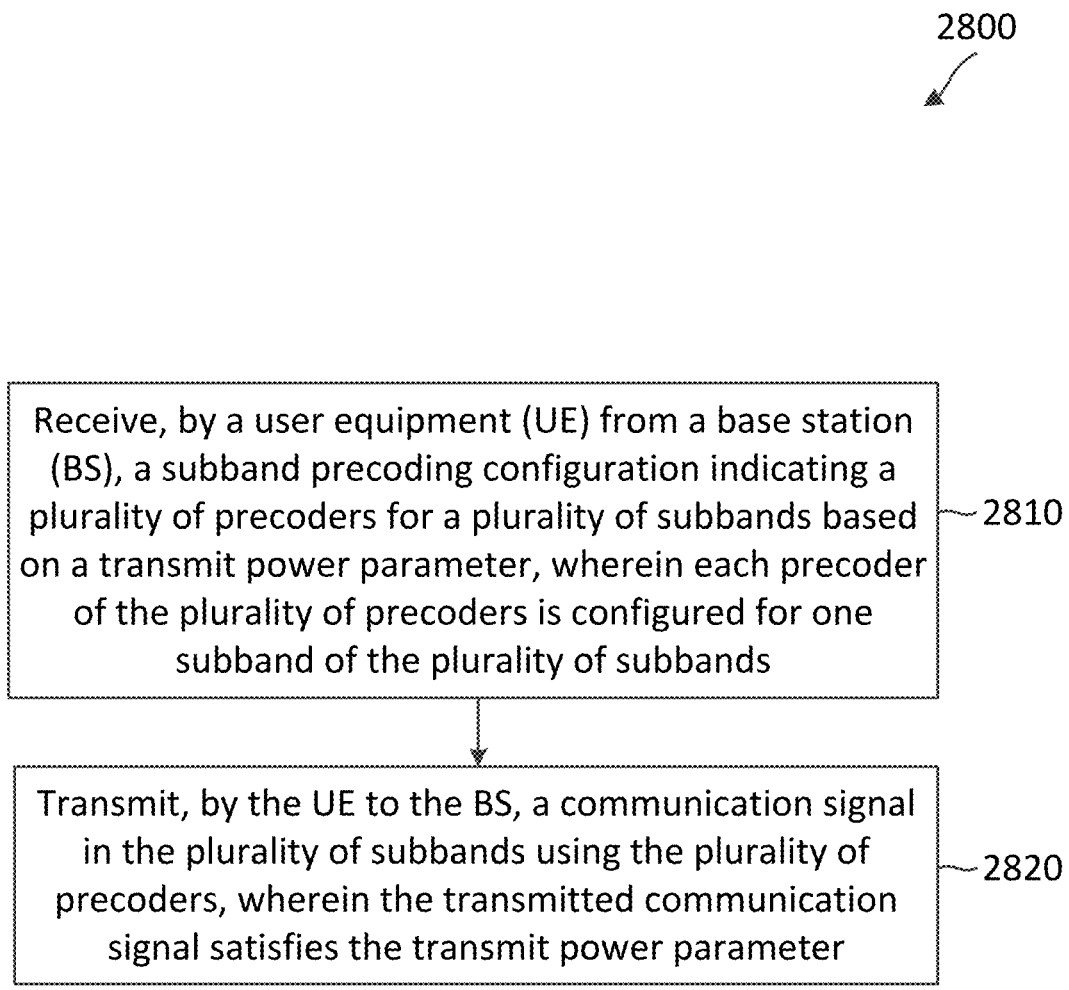
FIG. 28 is a flow diagram of a communication method according to some aspects of the present disclosure.

FIG. 28 is a flow diagram of a communication method 2800 according to some aspects of the present disclosure. Steps of the method 2800 can be executed by a computing device (e.g., a processor, processing circuit, and/or other suitable component) of a wireless communication device or other suitable means for performing the steps. For example, a wireless communication device, such as the UE 115, UE 315, UE 1300, UE 1502, and UE 2502, may utilize one or more components, such as the processor 1302, the memory 1304, the subband precoding module 1308, the transceiver 1310, the modem 1312, and the one or more antennas 1316, to execute the steps of method 2800. As illustrated, the method 2800 includes a number of enumerated steps, but aspects of the method 2800 may include additional steps before, after, and in between the enumerated steps. In some aspects, one or more of the enumerated steps may be omitted or performed in a different order.

At step 2810, the method 2800 receiving, by a user equipment (UE) from a base station (BS), a subband precoding configuration indicating a plurality of precoders for a plurality of subbands based on a transmit power parameter, where each precoder of the plurality of precoders is configured for one subband of the plurality of subbands. In an example, the UE may receive a first DCI including a pointer referencing the subband precoding configuration in second DCI and a size of the second DCI. The UE may determine, based on the first DCI, a first number of bits used for signaling the subband precoding configuration in the second DCI. The UE may receive the second DCI indicating the subband precoding configuration and accordingly, determine, based on the first number of bits included in the a second DCI, the subband precoding configuration. In another example, for one or more combinations of precoder types of a set of precoder types, the UE determines a number of bits for signaling the subband precoding configuration, the number of bits being based on a number of layers for PUSCH transmission and the respective combination of precoder types. The UE may identify, based on comparing the one or more number of bits, a greatest number of bits, where receiving the subband precoding configuration includes receiving a DCI indicating the subband precoding configuration. Additionally, the UE may determine the subband precoding configuration based on the greatest number of bits. In this example, the number of subbands for each PUSCH transmission may be fixed.

At step 2820, the method 2800 includes transmitting, by the UE to the BS, a communication signal in the plurality of subbands using the plurality of precoders, where the transmitted communication signal satisfies the transmit power parameter.

In some aspects, for one or more combinations of precoder types of a set of precoder types, the UE determines a number of bits for signaling the subband precoding configuration. The number of bits may be based on a number of layers for PUSCH transmission and the respective combination of precoder types. Additionally, the UE may identify, based on comparing the one or more number of bits, a greatest number of bits, where receiving the subband precoding configuration may include receiving a DCI indicating the subband precoding configuration. The UE may determine the subband precoding configuration based on the greatest number of bits. The number of subbands for each PUSCH transmission may be fixed. Additionally, the UE may determine a subband size of the PUSCH transmission based on a total number of allocated RBs and the number of subbands.

Figure 29:
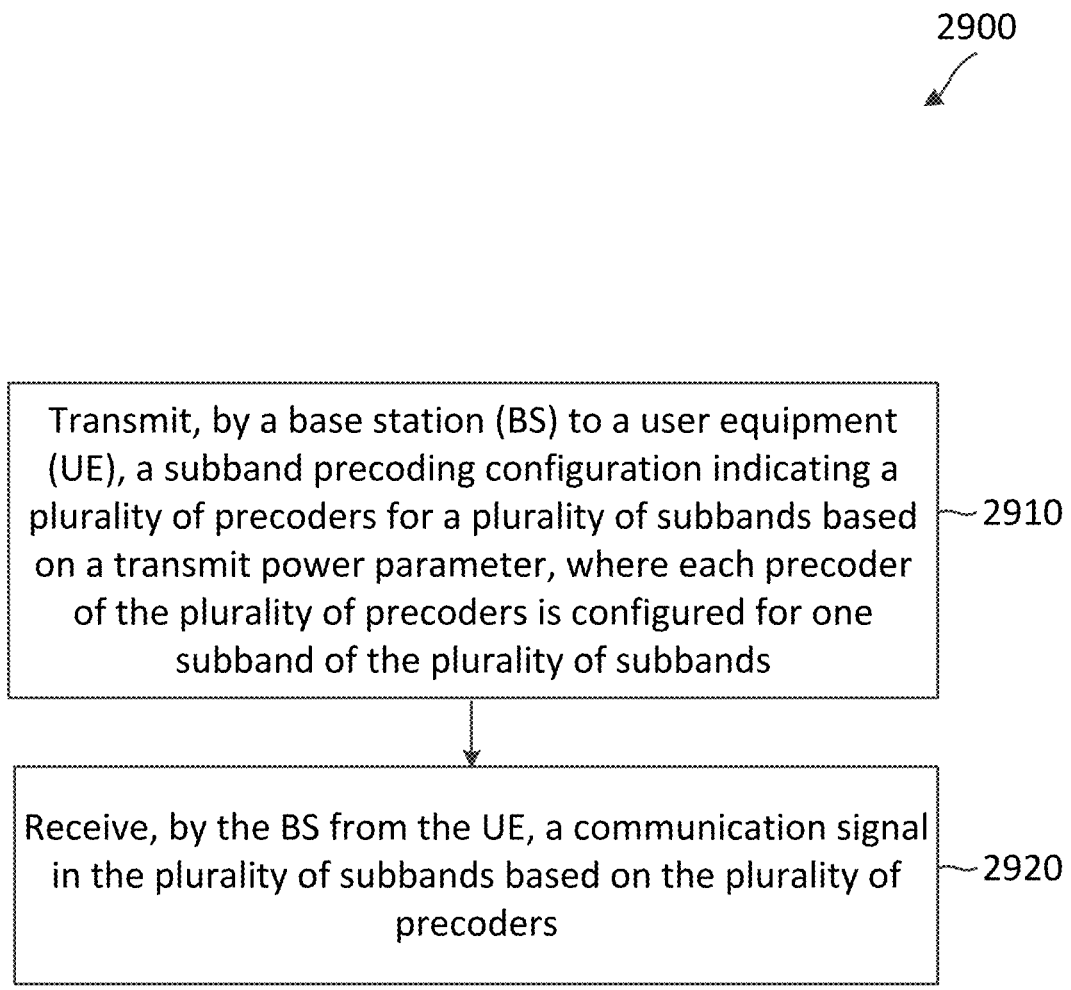
FIG. 29 is a flow diagram of a communication method according to some aspects of the present disclosure.

FIG. 29 is a flow diagram of a communication method 2900 according to some aspects of the present disclosure. Steps of the method 2900 can be executed by a computing device (e.g., a processor, processing circuit, and/or other suitable component) of a wireless communication device or other suitable means for performing the steps. For example, a wireless communication device, such as the BS 105, BS 1400, and/or BS 1605 may utilize one or more components, such as the processor 1402, the memory 1404, the subband precoding module 1408, the transceiver 1410, the modem 1412, and the one or more antennas 1416, to execute the steps of method 2900. As illustrated, the method 2900 includes a number of enumerated steps, but aspects of the method 2900 may include additional steps before, after, and in between the enumerated steps. In some aspects, one or more of the enumerated steps may be omitted or performed in a different order.

At step 2910, the method 2900 includes transmitting, by a BS to a UE, a subband precoding configuration indicating a plurality of precoders for a plurality of subbands based on a transmit power parameter, where each precoder of the plurality of precoders is configured for one subband of the plurality of subbands. In an example, the BS may transmit a first DCI including a pointer referencing the subband precoding configuration in a second DCI and a size of the second DCI. The pointer may include a first number of bits used for signaling the subband precoding configuration in the second DCI. The BS may transmit the second DCI indicating the subband precoding configuration and accordingly, transmit, based on the first number of bits included in the second DCI, the subband precoding configuration. In another example, for one or more combinations of precoder types of a set of precoder types, the BS determines a number of bits for signaling the subband precoding configuration, the number of bits being based on a number of layers for PUSCH transmission and the respective combination of precoder types. The BS may identify, based on comparing the one or more number of bits, a greatest number of bits, where transmitting the subband precoding configuration includes transmitting a DCI indicating the subband precoding configuration. In this example, the number of subbands for each PUSCH transmission may be fixed.

At step 2920, the method 2900 includes receiving, by the BS from the UE, a communication signal in the plurality of subbands based on the plurality of precoders.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   receiving, by a user equipment (UE) from a base station (BS), a subband precoding configuration indicating a plurality of precoders for a plurality of subbands, wherein the plurality of precoders indicated in the subband precoding configuration is based on a constant power spectrum density (PSD), and wherein each precoder of the plurality of precoders is configured for one subband of the plurality of subbands; and
   transmitting, by the UE to the BS, a communication signal in the plurality of subbands using the plurality of precoders, wherein the transmitted communication signal satisfies the constant PSD.

2. The method of claim 1, wherein the plurality of precoders is based on a UE capability of the UE, and wherein the UE capability is based on whether the UE is a fully coherent, partially coherent, or non-coherent UE.

3. The method of claim 1, wherein the UE has four antenna ports for physical uplink shared channel (PUSCH) transmission, and for a single-layer transmission, the plurality of precoders is devoid of non-coherent precoders.

4. The method of claim 3, wherein for the single-layer transmission, the plurality of precoders includes one of either a set of fully coherent precoders or a set of partially coherent precoders, wherein the set of partially coherent precoders includes a first subset of partially coherent precoders and a second subset of partially coherent precoders, and wherein if the plurality of precoders includes the set of partially coherent precoders, the plurality of subbands includes one of either the first subset or the second subset.

5. The method of claim 1, wherein the UE has four antenna ports for physical uplink shared channel (PUSCH) transmission, and for a two-layer transmission, the plurality of precoders is devoid of non-coherent precoders, wherein the plurality of precoders includes at least one of one or more fully coherent precoders or one or more partially coherent precoders.

6. The method of claim 1, wherein the UE has four antenna ports for physical uplink shared channel (PUSCH) transmission, and for a three-layer transmission, the plurality of precoders is devoid of non-coherent precoders, and wherein the plurality of precoders includes one or more fully coherent precoders or one or more partially coherent precoders.

7. The method of claim 1, wherein the UE has four antenna ports for physical uplink shared channel (PUSCH) transmission, and for a four-layer transmission, the plurality of precoders includes one or more fully coherent precoders, one or more partially coherent precoders, or one or more non-coherent precoders.

8. The method of claim 1, wherein the UE has two antenna ports for physical uplink shared channel (PUSCH) transmission, and for a single-layer transmission, the plurality of precoders is devoid of non-coherent precoders and further devoid of partially coherent precoders.

9. The method of claim 1, wherein the UE has two antenna ports for physical uplink shared channel (PUSCH) transmission, and for a single-layer transmission, the plurality of precoders includes only fully coherent precoders.

10. The method of claim 1, wherein the UE has two antenna ports for physical uplink shared channel (PUSCH) transmission, and for a two-layer transmission, the plurality of precoders includes one or more fully coherent precoders, one or more partially coherent precoders, or one or more non-coherent precoders.

11. An apparatus, comprising:
    a transceiver configured to:
      receive, by a user equipment (UE) from a base station (BS), a subband precoding configuration indicating a plurality of precoders for a plurality of subbands, wherein the plurality of precoders indicated in the subband precoding configuration is based on a constant power spectrum density (PSD), and wherein each precoder of the plurality of precoders is configured for one subband of the plurality of subbands; and transmit, by the UE to the BS, a communication signal in the plurality of subbands using the plurality of precoders, wherein the transmitted communication signal satisfies the constant PSD.

12. The apparatus of claim 11, wherein the plurality of precoders is based on a UE capability of the UE, and wherein the UE capability is based on whether the UE is a fully coherent, partially coherent, or non-coherent UE.

13. The apparatus of claim 11, comprising:

a processor configured to:

for one or more combinations of precoder types of a set of precoder types, determine a number of bits for signaling the subband precoding configuration, the number of bits being based on a number of layers for physical uplink shared channel (PUSCH) transmission and the respective combination of precoder types;

identify, based on comparing the one or more number of bits, a greatest number of bits, wherein receiving the subband precoding configuration includes receiving a downlink control information (DCI) indicating the subband precoding configuration; and determine the subband precoding configuration based on the greatest number of bits.

14. The apparatus of claim 13, wherein a number of subbands for each PUSCH transmission is fixed.

15. The apparatus of claim 14, wherein the processor is further configured to determine a subband size of the PUSCH transmission based on a total number of allocated resource blocks (RBs) and the number of subbands.

16. The apparatus of claim 11, wherein a number of layers is the same across the plurality of subbands of the transmitted communication signal.

17. The apparatus of claim 11, wherein the communication signal is a PUSCH transmission with a configured grant.

18. The apparatus of claim 17, wherein the transceiver is further configured to receive the subband precoding configuration by receiving from a BS via radio resource control (RRC) signaling, a number of subbands included in the plurality of subbands, a subband size of a subband of the plurality of subbands, and a precoder of the plurality of precoders for each subband of the plurality of subbands.

19. A non-transitory computer-readable medium having program code recorded thereon, the program code comprising:

code for causing a user equipment (UE) to receive from a base station (BS), a subband precoding configuration indicating a plurality of precoders for a plurality of subbands, wherein the plurality of precoders indicated in the subband precoding configuration is based on a constant power spectrum density (PSD), and wherein each precoder of the plurality of precoders is configured for one subband of the plurality of subbands; and code for causing the UE to transmit to the BS, a communication signal in the plurality of subbands using the plurality of precoders, wherein the transmitted communication signal satisfies the constant PSD.

20. The non-transitory computer-readable medium of claim 19, wherein the communication signal is a physical uplink shared channel (PUSCH) transmission with a configured grant.

21. The non-transitory computer-readable medium of claim 19, wherein the plurality of precoders is based on a UE capability of the UE, and wherein the UE capability is based on whether the UE is a fully coherent, partially coherent, or non-coherent UE.

22. The non-transitory computer-readable medium of claim 19, wherein the UE has four antenna ports for physical uplink shared channel (PUSCH) transmission, and for a single-layer transmission, the plurality of precoders is devoid of non-coherent precoders.

23. The non-transitory computer-readable medium of claim 19, wherein the UE has four antenna ports for physical uplink shared channel (PUSCH) transmission, and for a two-layer transmission, the plurality of precoders is devoid of non-coherent precoders, wherein the plurality of precoders includes at least one of one or more fully coherent precoders or one or more partially coherent precoders.

24. The non-transitory computer-readable medium of claim 19, wherein the UE has four antenna ports for physical uplink shared channel (PUSCH) transmission, and for a three-layer transmission, the plurality of precoders is devoid of non-coherent precoders, and wherein the plurality of precoders includes one or more fully coherent precoders or one or more partially coherent precoders.

25. An apparatus, comprising:

means for receiving from a base station (BS), a subband precoding configuration indicating a plurality of precoders for a plurality of subbands, wherein the plurality of precoders indicated in the subband precoding configuration is based on a constant power spectrum density (PSD), and wherein each precoder of the plurality of precoders is configured for one subband of the plurality of subbands; and means for transmitting to the BS, a communication signal in the plurality of subbands using the plurality of precoders, wherein the transmitted communication signal satisfies the constant PSD.

26. The apparatus of claim 25, wherein the communication signal is a physical uplink shared channel (PUSCH) transmission with a configured grant.

27. The apparatus of claim 25, wherein the UE has four antenna ports for physical uplink shared channel (PUSCH) transmission, and for a four-layer transmission, the plurality of precoders includes one or more fully coherent precoders, one or more partially coherent precoders, or one or more non-coherent precoders.

28. The apparatus of claim 25, wherein the UE has two antenna ports for physical uplink shared channel (PUSCH) transmission, and for a single-layer transmission, the plurality of precoders is devoid of non-coherent precoders and further devoid of partially coherent precoders.

29. The apparatus of claim 25, wherein the UE has two antenna ports for physical uplink shared channel (PUSCH) transmission, and for a single-layer transmission, the plurality of precoders includes only fully coherent precoders.

30. The apparatus of claim 25, wherein the UE has two antenna ports for physical uplink shared channel (PUSCH) transmission, and for a two-layer transmission, the plurality of precoders includes one or more fully coherent precoders, one or more partially coherent precoders, or one or more non-coherent precoders.

\* \* \* \* \*